United States Patent
Newson et al.

(10) Patent No.: US 7,720,908 B1
(45) Date of Patent: May 18, 2010

(54) SYSTEM AND METHOD FOR MULTI-LAYERED NETWORK COMMUNICATIONS

(75) Inventors: Paul E. Newson, Bellevue, WA (US); Roderick M. Toll, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 1939 days.

(21) Appl. No.: 09/800,394

(22) Filed: Mar. 6, 2001

Related U.S. Application Data

(60) Provisional application No. 60/187,511, filed on Mar. 7, 2000.

(51) Int. Cl.
*G06F 15/16* (2006.01)

(52) U.S. Cl. .............. 709/204; 709/205; 709/207; 719/328; 719/330

(58) Field of Classification Search .............. None
See application file for complete search history.

(56) References Cited

U.S. PATENT DOCUMENTS

| | | | |
|---|---|---|---|
| 5,195,086 A | 3/1993 | Baumgartner et al. | |
| 5,466,200 A * | 11/1995 | Ulrich et al. | 482/4 |
| 5,558,339 A * | 9/1996 | Perlman | 463/42 |
| 5,586,257 A * | 12/1996 | Perlman | 709/226 |
| 5,586,937 A * | 12/1996 | Menashe | 463/41 |
| 5,689,641 A | 11/1997 | Ludwig et al. | |
| 5,690,582 A * | 11/1997 | Ulrich et al. | 482/4 |
| 5,719,942 A | 2/1998 | Aldred et al. | |
| 5,785,630 A * | 7/1998 | Bobick et al. | 482/4 |
| 5,889,764 A * | 3/1999 | Needham et al. | 370/263 |
| 5,890,995 A * | 4/1999 | Bobick et al. | 482/4 |
| 5,921,891 A * | 7/1999 | Browne | 482/4 |
| 6,032,197 A * | 2/2000 | Birdwell et al. | 709/247 |
| 6,085,227 A | 7/2000 | Edlund et al. | |
| 6,138,144 A * | 10/2000 | DeSimone et al. | 709/204 |
| 6,144,991 A | 11/2000 | England | |
| 6,154,463 A * | 11/2000 | Aggarwal et al. | 370/408 |
| 6,195,091 B1 | 2/2001 | Harple et al. | |
| 6,212,548 B1 | 4/2001 | DeSimone et al. | |
| 6,219,045 B1 | 4/2001 | Leahy et al. | |
| 6,237,025 B1 | 5/2001 | Ludwig et al. | |
| 6,241,612 B1 * | 6/2001 | Heredia | 463/42 |
| 6,317,776 B1 * | 11/2001 | Broussard et al. | 709/204 |
| 6,343,313 B1 * | 1/2002 | Salesky et al. | 709/204 |

(Continued)

OTHER PUBLICATIONS

Gong, Fengmin. "Multipoint Audio and Video Contorl for Packet-Based Multimedia Conferencing." Proceedings of the Second ACM International Conference on Multimedia. San Francisco, CA. Oct. 1994. pp. 425-432. ACM Press.*

(Continued)

*Primary Examiner*—Rupal D Dharia
*Assistant Examiner*—Jeffrey R Swearingen
(74) *Attorney, Agent, or Firm*—Merchant & Gould P.C.

(57) ABSTRACT

A multi-layered network for transporting data comprises a first network layer that provides a first session topology, and a second network layer that provides a second session topology. The second network layer uses the first network layer to transport data. In one embodiment of the invention, the data sent by the second layer is real-time audio data, such as voice. Each session topology may be either peer-to-peer or client/server. The first and second layers may have different topologies and/or different session hosts. A deterministic algorithm is provided whereby a new session host is selected when the current host leaves the session.

14 Claims, 11 Drawing Sheets

U.S. PATENT DOCUMENTS

| | | | | |
|---|---|---|---|---|
| 6,434,599 | B1* | 8/2002 | Porter | 709/219 |
| 6,513,069 | B1* | 1/2003 | Abato et al. | 709/218 |
| 6,654,815 | B1 | 11/2003 | Goss et al. | |
| 6,707,820 | B1 | 3/2004 | Arndt et al. | |
| 7,278,920 | B1 | 10/2007 | Klamer et al. | |

OTHER PUBLICATIONS

El Malki et al., "Echo Cancellation for Voice Over ATM," *1999 Asia Pacific Microwave Conference*, 1999, 766-769.

Chio et al., "GATENET: A Voice/Data Internet Transport System," *IEEE Infocom '86*, 1986, 39-46.

Corley, "BellSouth Trial of Wideband Packet Technology," *IEEE International Conference on Communications ICC '90 Including Supercomm® Technical Sessions*, 1990, 3, 1000-1002.

Teraoka et al., "VIP: A Protocol Providing Host Mobility," *Communications of the ACM*, 1994, 37(8), 67-75, 113.

Teraoka et al., "A Network Architecture Providing Host Migration Transparency," *Computer Communication Review*, 1991, 21(4), 209-220.

Final Office Action in U.S. Appl. No. 11/614,597 dated May 12, 2009.

Final Office Action in U.S. Appl. No. 11/299,114 dated Jul. 21, 2008.

Office Action in U.S. Appl. No. 11/614,597 dated Jul. 9, 2008.

Office Action in U.S. Appl. No. 11/299,114 dated Jan. 8, 2008.

Office Action in U.S. Appl. No. 11/299,114 dated Mar. 25, 2008.

Kurlander, David et al. "Comic Chat". Proceedings of the 23rd annual conference on Computer graphics and interactive techniques SIGGRAPH '96. ACM Press. Aug. 1996. pp. 225-236.

Notice of Allowance in U.S. Appl. No, 11/614,597 dated Sep. 3, 2009.

Notice of Allowance in U.S. Appl. No. 11/299,114 dated Oct. 2, 2009.

* cited by examiner

SYSTEM AND METHOD FOR MULTI-LAYERED NETWORK COMMUNICATIONS

CROSS-REFERENCE TO RELATED CASES

This application claims the benefit of U.S. Provisional Application No. 60/187,511, entitled "DirectPlay Voice For DirectX 8.0," filed on Mar. 7, 2000, which is hereby incorporated by reference.

FIELD OF THE INVENTION

The present invention relates generally to the field of computer networking. More particularly, the invention provides an audio engine which sends audio or other data using a transport layer, and which creates and dynamically morphs an audio session whose topology is independent of the underlying transport layer's session topology.

BACKGROUND OF THE INVENTION

The world-wide increase in computer networking bandwidth has enabled large amounts of data to be transmitted quickly and at low cost. The availability of great bandwidth has invited the creation of applications that communicate data in quantities that were previously thought to be too costly or too cumbersome. One such application is real-time voice transmission. The notion of carrying on a video-conference or a video game between participants in different cities around the world was once unheard of. Today, applications that permit such activities are available as a cutting-edge technology; soon, such applications and the devices that support them will become commonplace. However, such applications require the transmission of real-time voice over a data network, and such voice transmission presents various problems.

First, network topologies are constantly evolving. Traditionally, network communication has used a "client/server" model in which one network node (the server) is the focal point for all communication from a group of other nodes (the clients); the clients communicate with the server but do not communicate with each other. The client/server model is, in some contexts, giving way to a "federated" or "peer-to-peer" model, in which each node can communicate directly with any other node (or, at least, in which the network provides a level of abstraction that makes it appear to each node as if such communication is possible). A voice transport that is dependent upon one model may not work in an environment that is dependent upon another model.

Second, the networks that provide the underlying data transport are constantly evolving as well. For example, data may be transmitted over a telephone line, Digital Subscriber Line (DSL), cable, Ethernet, etc. Each type of connection may use different protocol. Networks are typically built in layers, each of which provides its own protocol that may be used on top of another layer. As future communication technologies become more widespread (e.g., wireless data networking, satellite networking, etc.), these technologies may have their own peculiarities. If voice transport is dependent upon any protocol, structure of network layers, or underlying communications medium, it cannot easily be adapted to future technologies—or even to the multitude of presently-available communication technologies.

Third, conventional voice networking implementations require a fixed host for the voice session, and if the host leaves the session, the session cannot continue, which results in termination of the session.

While systems exist that either support real-time voice communication or can be adapted to do so (e.g., NetMeeting™, Hear Me, Net-2-Phone, AOL Messenger, applications based on the H.323 suite of protocols), they do not address the drawbacks discussed above. Thus, in view of the foregoing, there is a need for a networking system that overcomes the drawbacks of the prior art.

SUMMARY OF THE INVENTION

The present invention provides a communication architecture that transports voice using any network (or combination of network layers) that supports both guaranteed and non-guaranteed messaging. The voice transport system of the present invention supports various topologies for digital voice communication. For example, a voice transport system in accordance with the invention may support: (a) peer-to-peer; (b) forwarding; (c) mixing; and (d) echo. Additionally, the invention supports all of these voice topologies regardless of whether the underlying session/transport layer used to transport voice packets employs a client/server or peer-to-peer topology for data delivery.

A voice transport system in accordance with the invention packages voice data into frames and provides the frames to an underlying data network for delivery. For example, the voice transport system may deliver data using the DirectPlay networking protocol, which is part of the DirectX® application programming interface provided by Microsoft Corporation of Redmond, Wash. The voice transport system provides a protocol that enables voice connections and communications to take place on top of such a data network.

The protocol includes: a connection process; a disconnection process; a format for the transmission of voice data; a host migration process; and a set of general messages used during a voice session. The connection process includes the exchange of a set of messages that permits a node to join a voice session, provided that the joining node has a connection in the underlying transport. The disconnection process includes the exchange of a set of messages that permits a node to leave a voice session. The voice transmission format includes a voice packet header with a variety of message types.

The host migration process is used to change the host of a voice session—e.g., if the current host has left the session. The host is the primary keeper of the name-table in a peer-to-peer session. When such a host leaves a voice session, a new host must be selected in order for the session to continue. Each node in a session has a "host order ID," which may be assigned at the time the node joins the session. At the time that a host leaves the session, it runs a host migration election algorithm to determine whether there is any node that can take over as host. If there is no such node, the host sends a "session lost" message, which tells any node in the process of connecting that the host is leaving. If there is a node that can take over as host, the host sends a "host migrate leave" message. In response, all nodes run the host selection algorithm. The new host discovers that it is, in fact, the new host by running the algorithm. Once the new host discovers that it is the new host, it sends a "host migrated" message to all other nodes to notify those nodes that it is the new host. The other nodes respond with a confirmation message.

Communication between the voice layer and the session/transport layer is provided by a set of application programmer interfaces (APIs). The transport layer exposes an API which is callable by the voice layer. The voice layer calls this API in order to send and receive data over the session/transport layer. The voice layer exposes an API which is used by the session/ transport layer to notify the voice layer of events—e.g., the entry or exit of a node from the session/transport layer.

One exemplary application of the invention is voice messaging in a multi-player game, where the different players are connected by a data network, such as the Internet. The different player machines may use a session/transport layer to communicate various information with each other (e.g., the position of the player in the playing domain), and the voice transport layer may use the session/transport layer to transmit voice packets during the game (e.g., a player uses a microphone to send a voice message to other players, which is transmitted by the voice layer over the session/transport layer). However, it will be appreciated that the invention may be used in any context in which real-time voice communication is desirable, particularly those contexts in which voice data is transmitted together with other types of data—e.g., video conferencing, virtual meetings, telephony, etc. It should also be appreciated that digital voice is merely a type of data, and the architecture of the present invention may be used to transport any type of data, whether or not such data is voice, or even audio.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

Networks are built in layers. One layer of a typical network is a basic data delivery protocol, such as the User Datagram Protocol (UDP). A next (second) layer may be a transport protocol, which provides such features as session management and guaranteed delivery. The second layer provides these features by performing various bookkeeping tasks (e.g., keeping track of which nodes are current members of a session), and by using the first layer to send administrative data between the nodes. In some applications, it may be useful to provide a third layer. For example, the second layer may perform general data transport, and the third layer may be an "audio engine" which collects audio data (e.g., with a microphone), packages the audio data, and uses the second layer to perform the actual sending and receiving of audio data. The third layer may provide its own protocol and/or networking features. For example, the third layer may provide audio sessions that can be connected to, disconnected from, hosted, configured, etc.—independently of any sessions that may exist on the second layer. The present invention provides a protocol for such a third layer, as well as various techniques used in the course of operating such a layer.

Exemplary Computing Environment

Figure 1:
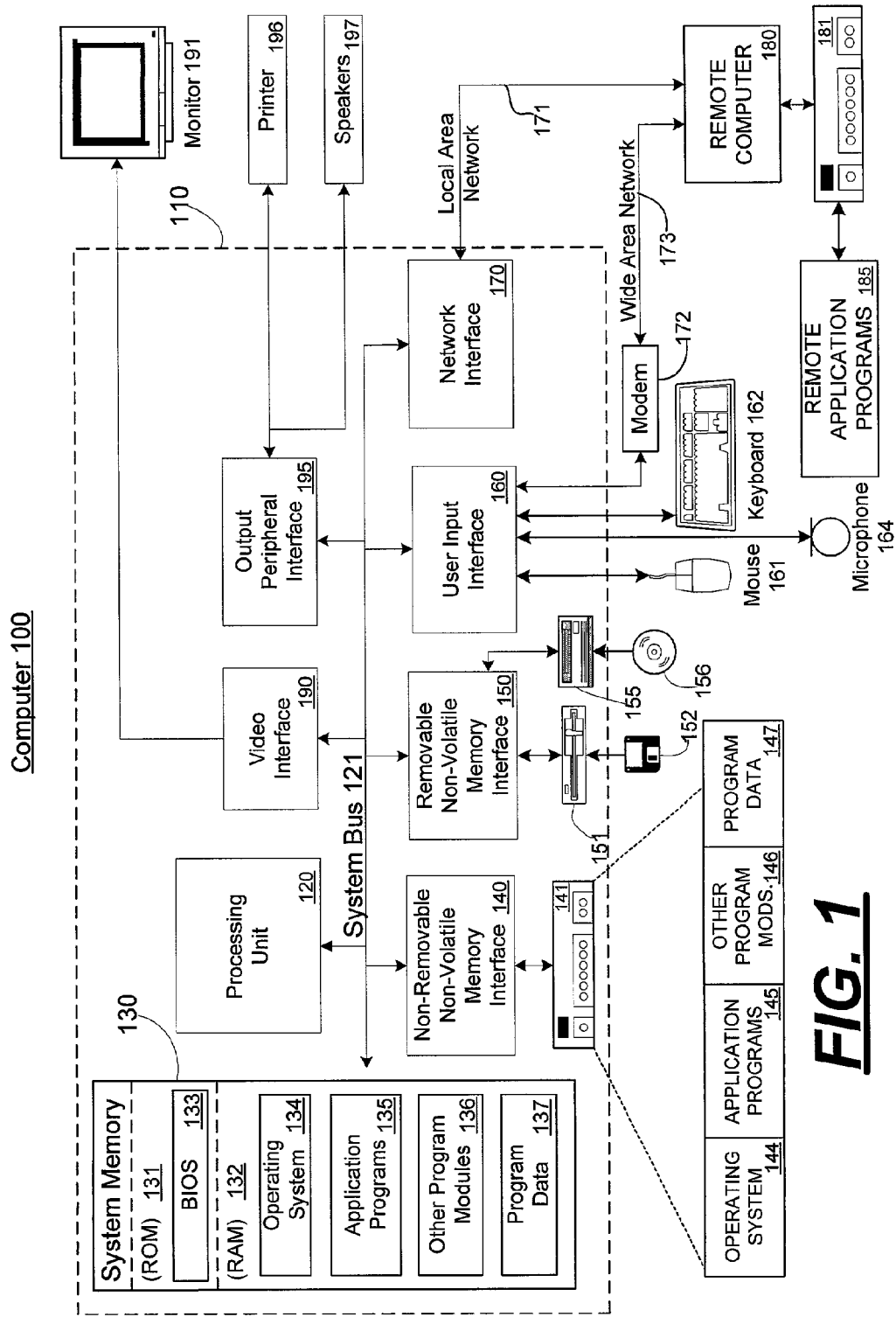
FIG. 1 is a block diagram of an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. An audio input device, such as microphone 164, may be provided. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Layered Networks

Figure 2:
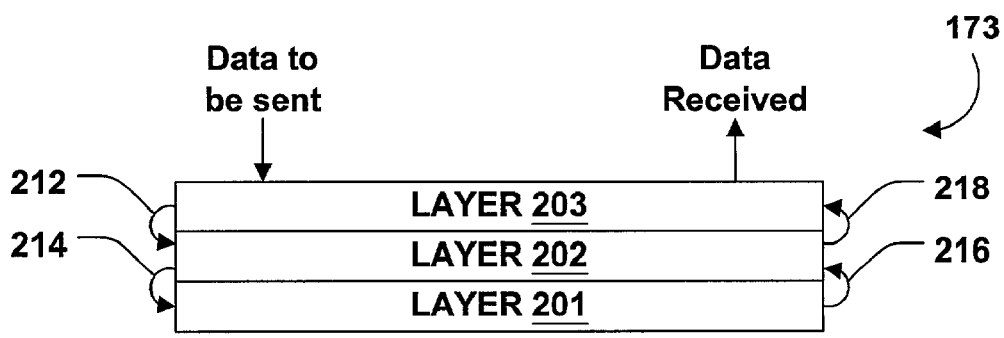
FIG. 2 is a block diagram of a network having plural layers.

As described above in connection with FIG. 1, two or more computing devices may communicate with each other via a computer network. For example, FIG. 1 shows computing devices 110 and 180 communicatively coupled by, inter alia, wide-area network 173. As previously noted, wide-area network 173 may comprise the Internet. A computer network, such as wide-area network 173, may be built in layers. FIG. 2 shows an example of a network that is built in layers.

In the example of FIG. 2, wide-area network 173 comprises various layers, including layers 201, 202 and 203. Layer 201 is the basic network layer that provides a delivery protocol allowing data to be delivered over network 173. Layer 202 uses layer 201 to provide actual data delivery, but layer 202 provides some level of abstraction beyond mere data delivery. For example, layer 202 may implement one or more networking abstractions. As one non-limiting example, layer 202 may be a session/transport layer that supports the networking model of a "session"—i.e., two nodes can communicate if they are in the same session. In this case, layer 202 provides the function of allowing nodes to connect to or disconnect from a session, as well as generating and sending between nodes the administrative data that supports the model of a "session." However, layer 202 employs layer 201 to provide the actual data delivery. That is, when layer 202 receives data to be sent from one node to another, it packages the data and provides the package to layer 201 with instructions to deliver the package to a specified destination (as indicated by arrow 214). Likewise, when layer 202 generates "administrative" data that supports, say, the "session" concept (e.g., requests to connect or disconnect from a session, dropped session signals, etc.), layer 202 provides such messages to layer 201 for delivery to their destinations.

Exemplary network 173 includes a third layer 203, which may, for example, be a session/presentation layer that provides an additional level of networking abstraction on top of layer 202. In the present example, layer 201 provides basic data delivery, layer 202 supports the model of "sessions" between nodes, and layer 203 may provide support for, say, audio delivery. For example layer 203 may receive live audio (e.g., a human voice from a microphone attached to a computing device) in the form of a digital signal, for delivery to a particular node on the network. In this case, layer 203 may package the audio into "frames" as it is captured, and provide the frames to layer 202 for delivery to a destination node in the session provided by layer 202 (as indicated by arrow 212). (As discussed below, layer 203 may provide its own "sessions" independently of the session that layer 202 provides.) When layer 202 receives the packaged audio frame, it uses layer 201 to provide the actual delivery of the data in the frames. When data is received at the receiving node, the data may be unpackaged by each of the successive layers. That is when, a package is received at the receiving node, layer 201 unpackages the contents and provides the contents to layer 202 (as indicated by arrow 216). In the case where the package contents is actually a second package to be process by layer 203, layer 202 further unwraps this second package and provides the second package's contents to layer 203 (as indicated by arrow 218).

In one example, layer 201 is a basic data delivery protocol that is capable of providing at least non-guaranteed packet delivery. A non-limiting example of such a protocol is the User Datagram Protocol (UDP), although it will be appreciated that layer 201 may comprise any data delivery protocol. Moreover, layers 202 and 203 may include any protocol that provides any sort of networking abstraction beyond basic data delivery. For example, layer 202 may be a protocol that handles all data delivery between players' computing devices in multi-player games. Moreover, these multi-player games may allow players to exchange data with each other, and layer 203 may support a voice communication facility that packages digital audio data captured by the respective players' microphones and transmits the digital audio data using layer 202. While FIG. 2 depicts network 173 having three layers, it will be appreciated that three layers are merely exemplary, and a network may have any number of layers.

Figure 3:
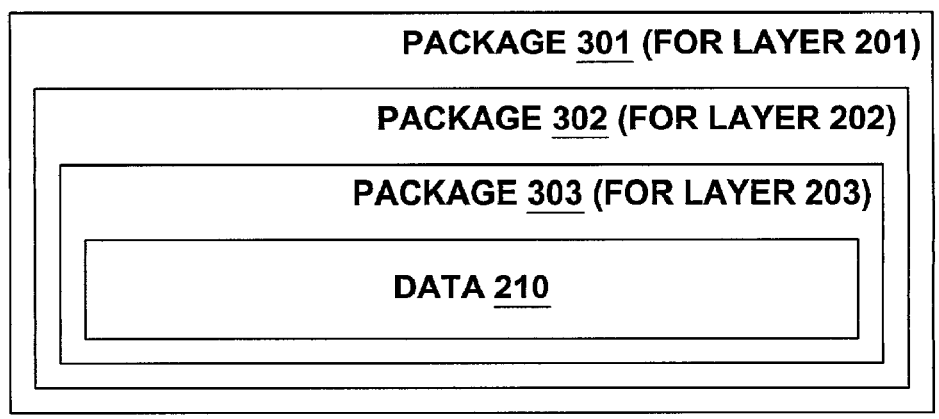
FIG. 3 is a block diagram of data packaged for transmission over a multi-layered network.

FIG. 3 shows data 210 packaged for delivery by layers 201, 202, and 203. Each layer provides its own packaging, such that data 210 is wrapped in a series of "nested" packages by the time the data reaches layer 201.

Data 210 is first delivered to layer 203, which wraps data 210 in package 303. For example, if layer 203 is an audio networking layer, then data 210 may be digital audio data captured by a microphone as noted above. Layer 203 wraps a frame of audio data into package 303 and provides package 303 to layer 202. Layer 202, in turn, wraps package 303 into package 302 and provides package 302 to layer 201. Layer 201 then wraps package 302 into package 301. The result is the series of nested packages shown in FIG. 3.

Figure 4:
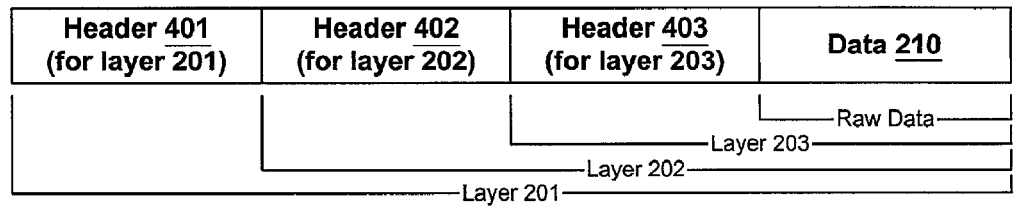
FIG. 4 is a block diagram of a data packet having plural headers corresponding to the plural layers shown in FIG. 2.

The nesting of packages may be accomplished by each layer's appending its own header to data 210, as shown in FIG. 4. For example, when raw data 210 is provided to layer 203, layer 203 appends header 403, thereby producing a package that contains header 403 followed by data 210. When layer 203 provides the package to layer 202, layer 202 appends header 402, thereby producing a package that contains header 402, followed by header 403. Layer 202 then provides the package to layer 201; layer 201 appends header 401, thereby producing a package that contains header 401, followed by header 402, followed by header 403, followed by data 210. When the data is transported to its destination, the headers may be stripped in reverse order: i.e., layer 201 receives a package with headers 401, 402, and 403, strips header 401, and provides the resulting package (i.e., a package with headers 402 and 403) to layer 2, and so on. The top level then strips the last header to yield data 210. It should be understood that the reference to "headers" 401, 402, and 403 is merely exemplary, as each layer may append data to the package in any manner, regardless of whether such data is a "header." For example, one or more of the layers may append data to the end of the package, as a "footer."

Data Session Topologies

Networks may provide "sessions" having various topologies. Examples of such topologies are "peer-to-peer," and "client/server." In a peer-to-peer topology, each node in a session can communicate directly with each other node in the session. One node in the session may be designated as a "host." The host maintains a "name table" of all the nodes in the session. Like a peer-to-peer session, a client/server session also has a host. However, in a client server session, each "client" node can communicate directly only with the host (or "server"). Any message from one client node to another is routed through the host.

Figure 5:
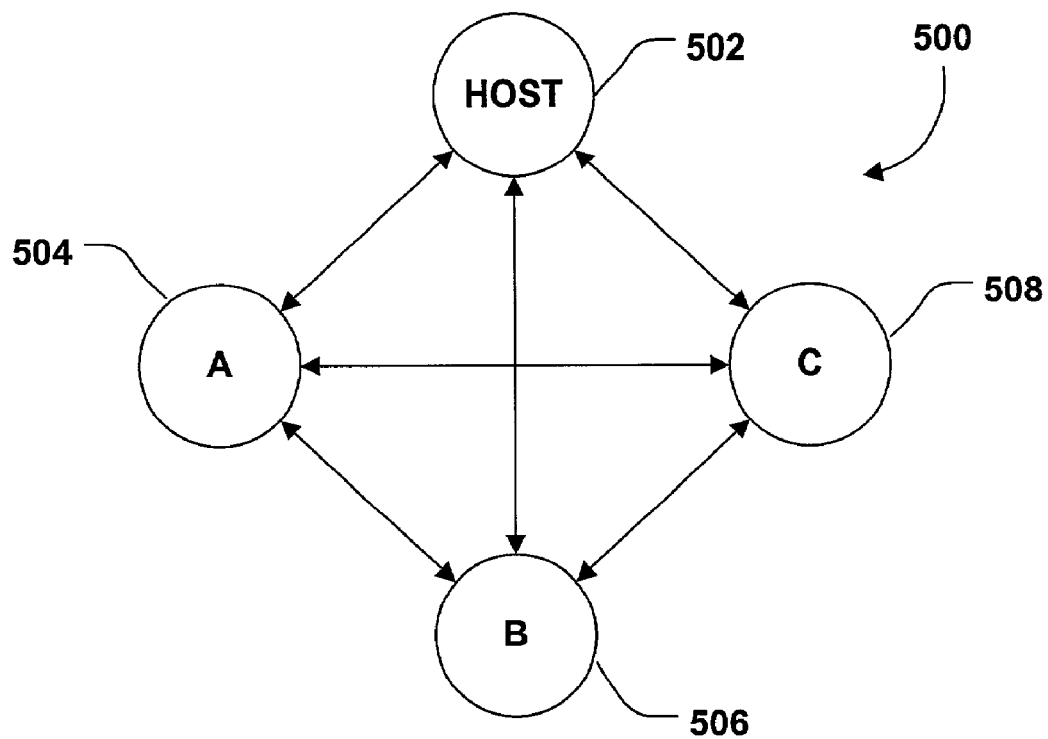
FIG. 5 is a block diagram of a plurality of network nodes which participate in an exemplary peer-to-peer data session.

FIG. 5 shows an exemplary peer-to-peer session 500. Peer-to-peer session 500 includes host node 502, as well as nodes 504, 506, and 508. Each of nodes 502, 504, 506, and 508 communicates directly with each other node. For example, node 504 ("A") can send a message directly to node 508 ("C"). Host 502 maintains a name table, which lists all of the nodes 502, 504, 506, and 508 that are currently in session 500. Each of nodes 504, 506, and 508 preferably maintains a copy of the name table.

Figure 6:
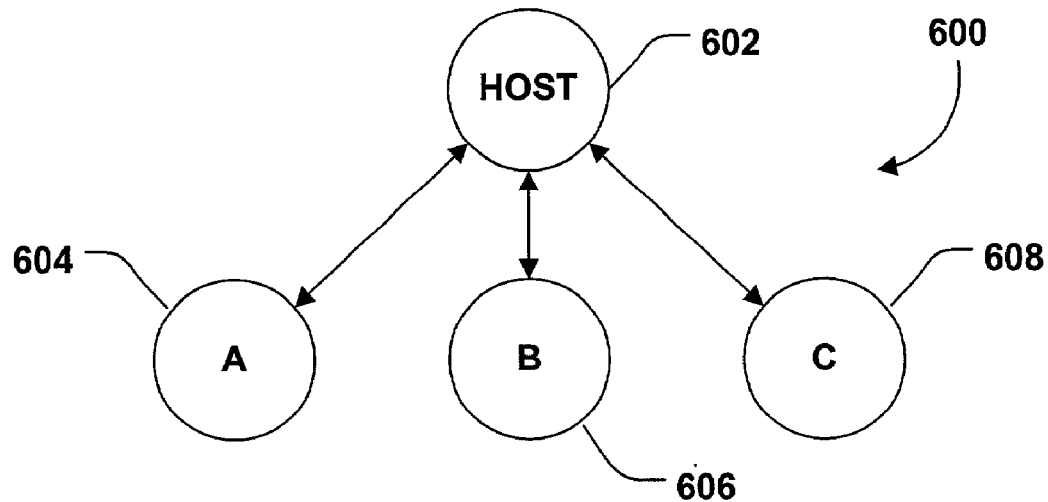
FIG. 6 is a block diagram of a plurality of network nodes which participate in an exemplary client/server data session.

FIG. 6 shows an exemplary client/server session 600. Client/server session 600 includes host node 602, which functions as the "server." Client/server session 600 also includes client nodes 604, 606, and 608. Host node 602 communicates directly with client nodes 604, 606, and 608. Client nodes 604, 606, and 608 communicate with each other through host node 602, but do not communicate directly with each other. As in the case of peer-to-peer sessions, host node 602 maintains a name table of nodes that are currently in session 600.

A session/transport layer may provide a session topology such as the peer-to-peer topology depicted in FIG. 5, or the client/server topology depicted in FIG. 6. For example, layer 202 (shown in FIG. 2) may implement a client/server topology, wherein every node in a session communicates with every other node through a host. In this case, layer 202 may use layer 201 to communicate data from a client node to the host. For example, if client node 604 (shown in FIG. 6) uses layer 202 to send data to client node 608, then layer 202 uses layer 201 to send the data from client node 604 to host node 602. The layer 201 logic at host node 602 receives the data and delivers it to layer 202. Layer 202 at host node 604 determines that the data is destined for client node 608 (e.g., the destination information may be in the layer 202 header attached to the data). Layer 202 at host node 602 provides the data to layer 201 for delivery to client node 608.

Alternatively, layer 202 may implement a peer-to-peer session topology. In this case, layer 202 uses layer 201 to send data directly from the source node to the destination node, without routing each message through the host.

Audio Session Topologies

Just as a session/transport layer may provide a session having a particular topology (as shown in FIGS. 5 and 6), an audio layer may also provide an audio session having a topology. As discussed above in connection with FIG. 2, inasmuch as audio is merely a type of data, a network may provide an audio layer (e.g., layer 203) on top of a session/transport layer (e.g., layer 202). That is, the audio layer may provide various functionality for processing audio, but may use the session/transport layer to send the audio data. Moreover, the audio layer may provide a session that is independent of the data transport session; the audio layer session may have a topology that differs from the topology of the underlying data transport session. FIGS. 7-10 show examples of audio session topologies.

Figure 7:
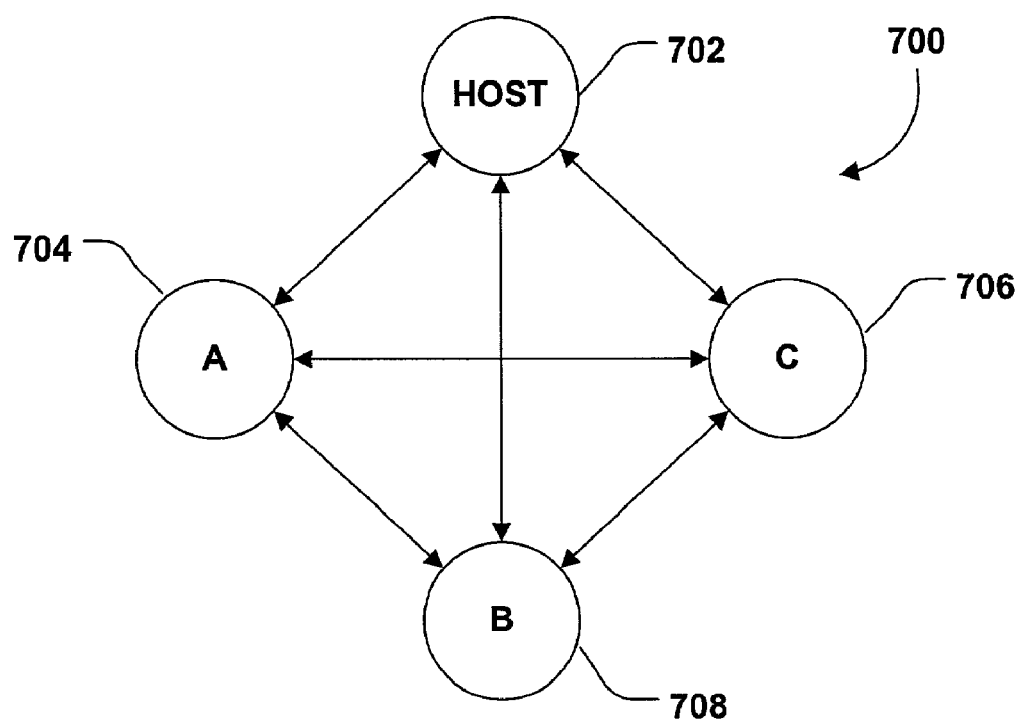
FIG. 7 is a block diagram of a plurality of network nodes which participate in an exemplary peer-to-peer audio session.

FIG. 7 shows a peer-to-peer audio session 700. The topology of FIG. 7 is similar to the topology of FIG. 5: session 700 comprises, in this example, four nodes 702, 704, 706, and 708. Node 702 is a host for session 700, and maintains a name table for session 700. Nodes 702, 704, 706, and 708 communicate audio directly with each other—that is, when an audio network layer employs the peer-to-peer topology of session 700, nodes 702, 704, 706, and 708 can send audio messages directly to each other.

Figure 8:
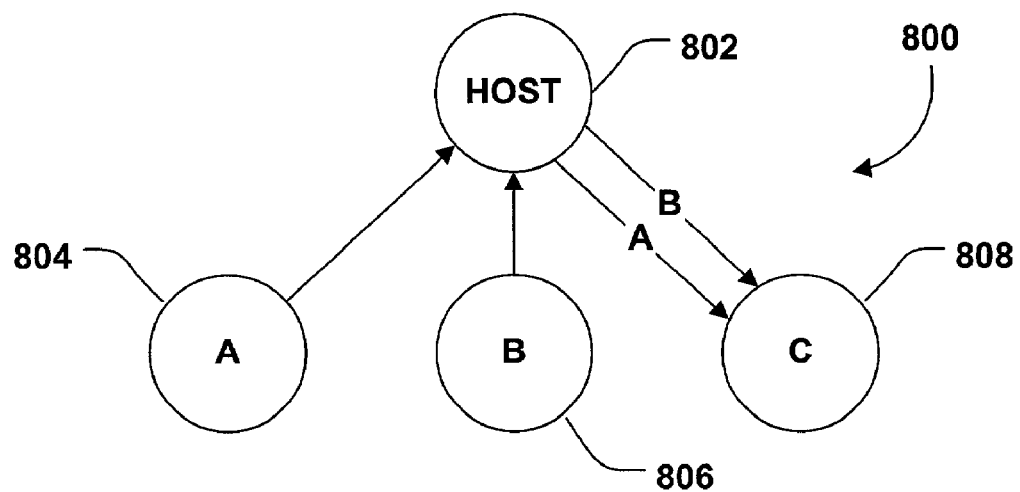
FIG. 8 is a block diagram of a plurality of network nodes which participate in an exemplary forwarding audio session.

FIG. 8 shows a first type of client/server audio session 800 called a "forwarding" session. Forwarding client/server session 800 comprises, in this example, four nodes 802, 804, 806, and 808. Node 802 is a host for session 800. Nodes 804, 806, and 808 are client nodes. Client nodes 804, 806, and 808 communicate with host node 802, and node 802 forwards audio data received from one client node to another client node. In the example of FIG. 8, client nodes 804 ("A") and 806 ("B") send audio data to client node 808 ("C") through host node 802. Client nodes 804 and 806 send their respective audio data to host node 802, which then forwards the received audio data, separately, to client node 808.

Figure 9:
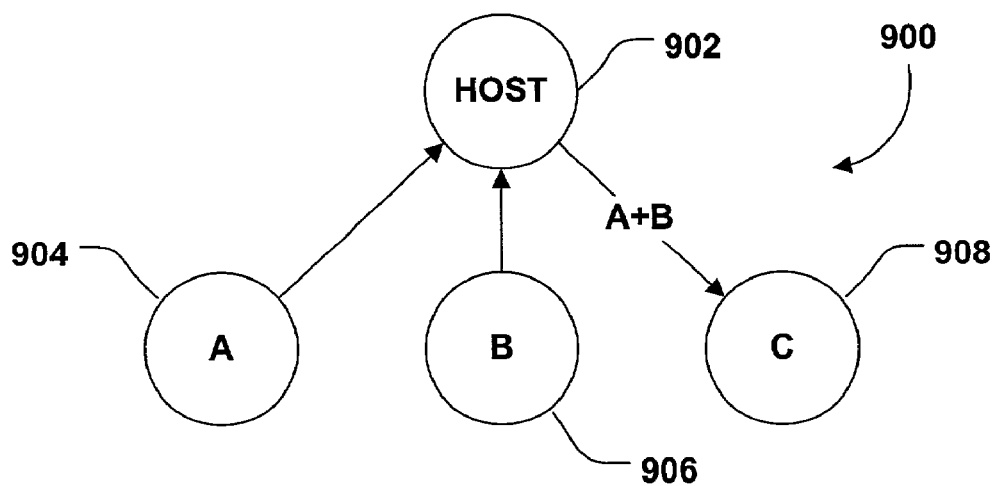
FIG. 9 is a block diagram of a plurality of network nodes which participate in an exemplary mixing audio session.

FIG. 9 shows a second type of client/server audio session 900 called a "mixing" session. Mixing client/server session 900 comprises, in this example, four nodes 902, 904, 906, and 908. Node 902 is a host for session 900. Mixing client/server session 900 is similar to forwarding client/server session 800, in that client nodes 904, 906, and 908 communicate directly only with host node 902, and communicate with each other by way of host node 902. However, in mixing client/server session 900 host node 902 combines audio data destined for a particular client and sends the destination client a single, mixed stream comprising all of the audio data destined for that client. The mixed stream may include data sent by more than one client. For example, in FIG. 9, client nodes 904 ("A") and 906 ("B") each send audio data to client node 908 ("C"). Client nodes 904 and 906 send their respective audio data to client node 908 by way of host node 902. Host node 902 sends the audio data to client node 908 in a single, combined stream. This method is in contrast to forwarding client/server session 800, wherein the host node sends audio data to the destination client in a separate stream for each client who generates audio data.

Figure 10:
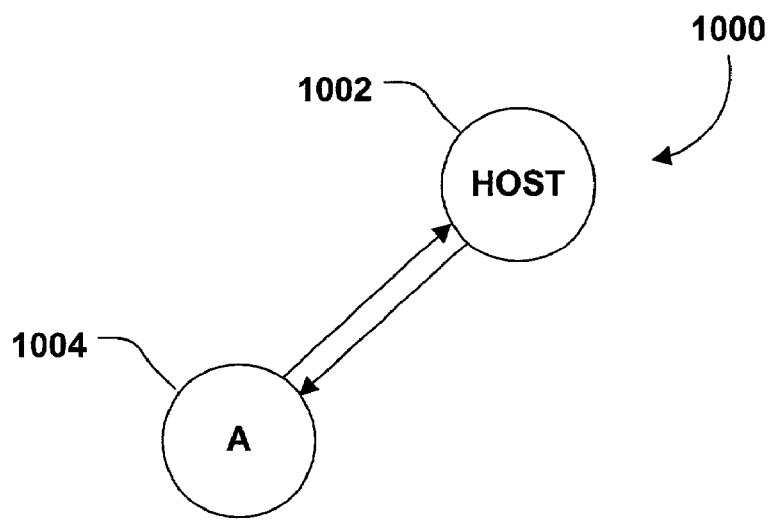
FIG. 10 is a block diagram of a plurality of network nodes which participate in an exemplary echo audio session.

FIG. 10 shows an echo session 1000. In an echo session, a client sends voice data to the host, which then re-sends the data back to the client who sent the data. Echo session 1000, in this example, comprises two nodes 1002 and 1004. Node 1002 is a host for session 1000, and node 1004 is a client. Node 1004 sends audio data to host node 1002; host node 1002 then sends the same audio data back to client node 1004. The topology of echo session 1000 may be useful for testing or debugging an audio network layer.

Using an Audio Session Topology with a Data Session Topology

An audio network layer may be built "on top of" a session/transport layer. For example, an audio layer may provide any (or all) of the audio session topologies depicted in FIGS. 7-10, and may then use a session/transport layer to send the audio data to the other nodes in the audio session. With reference to the "layer" model shown in FIG. 2 and discussed above, the audio layer may, for example, correspond to layer 203, while the session/transport layer may correspond to layer 202. Moreover, the session/transport layer may have a session topology that differs from, and is independent of, the audio layer. For example, the audio layer may provide a peer-to-peer session topology (depicted in FIG. 7), while the session/transport layer provides a client/server session topology (depicted in FIG. 6). In a preferred embodiment of the invention, an audio layer having any of the session topologies shown in FIGS. 7-10 may be built on top of a session/transport layer that has any of the session topologies shown in FIGS. 5-6.

Figures 11, 12:
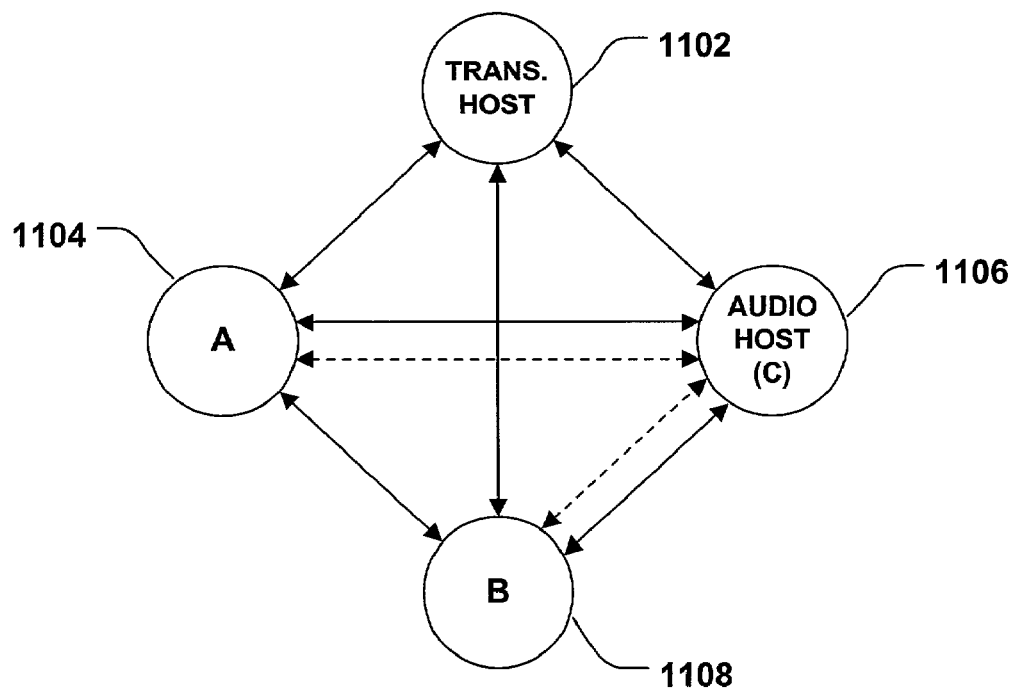
FIG. 11 is a block diagram of a plurality of nodes in a network, wherein the nodes variously have membership in two different sessions.
FIG. 12 is a block diagram of an exemplary name table in accordance with aspects of the invention.

FIG. 11 shows an exemplary situation in which an audio layer has a client/server session topology, where the audio layer uses a session/transport layer to send audio data. In the example of FIG. 11, the session/transport layer has a peer-to-peer session topology. Communication within the transport session is shown by solid lines, and communication within the audio layer session is shown by dashed lines. The audio session includes nodes 1104, 1106, and 1108, of which node 1106 is the host. The transport session includes nodes 1102, 1104, 1106 and 1108, of which node 1102 is the host. Since the transport session has a peer-to-peer topology, each of nodes 1102, 1104, 1106, and 1108 can communicate directly with each other. Audio session has a client/server topology, and thus nodes 1104 and 1108 can communicate directly with audio session host node 1106, but cannot communicate directly with each other; nodes 1104 and 1108 can, however, communicate indirectly with each other through host node 1106. It should be observed that the transport session may include a node (node 1102, in this example) which is not a member of the audio session. Moreover, it will further be observed that the transport and audio sessions have different hosts. In greater generality, it is the case that the audio session may include the same nodes as the transport session or a subset of the transport session nodes; furthermore, the transport and audio sessions may have the same host or different hosts.

Suppose, for example, that node 1104 ("A") sends audio data to node 1108 ("B"). Since the audio session is client/server with node 1106 as the host, node 1104 can send directly only to node 1106 within the audio session. As noted above, the underlying transport session is a peer-to-peer session which does permit node 1104 to communicate directly with node 1108; however, from the perspective of the audio layer, node 1108 is not directly addressable from node 1104. Thus, audio layer provides the audio data to the transport layer with instructions to deliver the data to node 1106. The data may be packaged with a header that indicates that node 1106 is to forward the data to node 1108. It will be observed that the transport layer is configured to deliver data directly from node 1104 to node 1108, but the audio layer is not configured to communicate in this manner. Thus, when the transport layer receives the data, it simply delivers the data to node 1106, as it has been requested to do by the audio layer. It should further be observed that the transport layer's delivery of the data from node 1104 to 1106 is performed in accordance with the transport layer's topology. In this example, the transport layer is peer-to-peer, and thus supports direct communication between any nodes in the session. In another example, the transport session could be client/server where node 1102 is the host of the transport session. In such a case, the transport layer would fulfill delivery of the data provided by the audio layer by sending the data through the host node 1102; this is another example of how transport layer sends data in accordance with the transport layer's topology.

The ability of the audio layer to support a session model (e.g., client/server, in this example) without concern as to how the data actually gets delivered demonstrates the generality and flexibility provided by building one network layer on top of another. In a preferred embodiment of the invention, an audio layer having any session topology may work with a session/transport layer having any session topology. That is, the session topology of the audio layer may be selected without regard to the session topology of the underlying transport.

Exemplary Name Table Data Structure

FIG. 12 shows an exemplary data structure for a name table 1200 that may be used by an audio layer 203. Exemplary name table 1200 has two columns: an audio layer ID 1204, and a "host order ID" 1206 (discussed below). Each row corresponds to a particular node in the session.

The audio layer ID is a number used to identify the node in audio layer 203. Transport layer 202 and audio layer 203 may have different identifiers for the same node, but transport layer 202's identifier for a particular node is not known to audio layer 203. Transport layer 202 maintains a table that correlates transport session IDs with audio session IDs. The host order ID iS a number that is used by an exemplary host migration algorithm (discussed below) in order to elect the new host of a session if the existing host leaves the session.

Protocol for an Audio Layer

As discussed above, an audio layer may be built on top of a session/transport layer. One exemplary use of such a multi-layered structure is in the case of multi-player games, where the different players communicate with each other over a computer network. For example, a game may employ a session/transport layer to communicate basic information about the game (e.g., player position, player score, players entering and leaving the game, etc.). Such a game may also employ an audio layer to support voice communication between the players. In other words, the audio layer may collect audio data (e.g., through the players' microphones) and use the session/transport layer to transport that audio data to other players. An example of such a multi-layered system is the DirectX® application programming interface (API) provided by Microsoft Corporation. The DirectX® API provides a data communication API that supports data communication between players in multi-player games. The data communications API uses a protocol that facilitates communication between players' machines over various different types of network connections. Moreover, the DirectX® API also provides a voice communication API that supports voice communication between players, and that uses the data communication protocol to transport voice data between players. This is an example of a voice layer being built on top of a session/transport layer. It will be understood that the DirectX® API, as well as gaming environment, are merely exemplary. The invention applies to any application in which it may be useful transport both audio and other types of data between nodes in a network, whether or not such application is a game. Moreover, the DirectX® API is merely one example of a system that supports an audio layer built on top of a session/transport layer.

An exemplary protocol for an audio layer includes five aspects: (1) connection; (2) disconnection; (3) transmission of audio data; (4) general messages; and (5) host migration. These aspects of the exemplary audio layer protocol are described below.

Connection

Connection is the process by which a client node connects to an audio session. Preferably, the client is connected to a session in the underlying transport before connecting to the audio session (i.e., the transport is a member of the underlying data-layer session that is used to transport audio data). Messages sent during the connection process are sent by "guaranteed" delivery.

Figure 13:
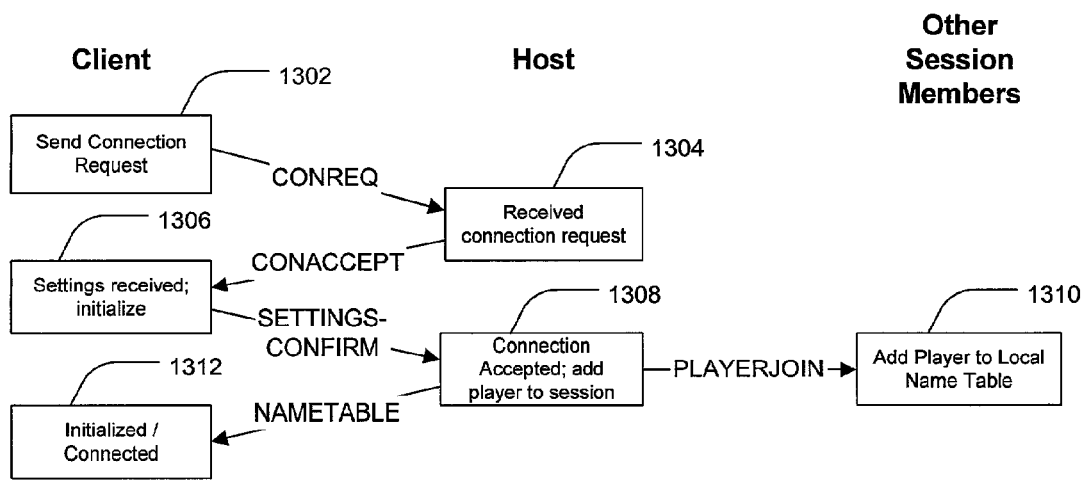
FIG. 13 is a diagram of an exemplary process of connecting to a session in accordance with aspects of the invention.

An exemplary process for connecting to a session is shown in FIG. 13. A client node initiates the connection process (block 1302) by sending a connection request ("CONREQ") message to all other nodes in the session. (If the session is a client/server session, then the CONREQ message is sent to the host, since it is only possible for a non-host node to send to the host in a client/server session.). If the client does not hear a response from the host within a timeout period, then the client re-sends the CONREQ message. Preferably, the CONREQ message contains the protocol version of the client.

The host, after receiving the CONREQ message (block 1304) responds with a connection-accept ("CONACCEPT") message if the client is allowed to connect. Preferably, the CONACCEPT message contains a compression type used for the session, session type, session flags and protocol version. If the client is to be denied the connection, a connection-reject message is sent from the server to the client, which describes the reason the client was denied the connection. For example, a client may be denied a connection if its protocol version is incompatible with the audio session, or if the host encounters an internal error. Receipt of a connection-reject message causes the client to discontinue the attempt to connect to the session.

The client, upon receiving the CONACCEPT message attempts to initialize itself using the settings specified in the CONREQ message (block 1306). If the client cannot initialize itself with the given settings (e.g. the protocol version is not compatible, or the client does not have the specified compression type) then it discontinues its connection attempt. If the client is successful in initializing itself with the given settings it responds to the server with a confirmation ("SETTINGSCONFIRM") message. The SETTINGSCONFIRM message preferably contains configuration information about the client.

The server, upon receiving the SETTINGSCONFIRM message (block 1308) adds the newly-connected client to the list of members in the audio session—e.g., by adding the newly-connected client to the name table. If the audio session is peer-to-peer, then the host sends all the clients in the session a message to that effect. (In the example of FIG. 13 where the audio session is a voice communication session for a multi-player game, the message is labeled "PLAYERJOIN". It will be understood, however, that audio sessions are not limited to the gaming context where clients are "players." Any message that indicates that a new client has joined the audio session, regardless of whether the new client is a "player," may be used without departing from the spirit and scope of the invention.) The exemplary PLAYERJOIN message preferably contains information about the newly-connected client, including; their host order ID (described below in connection with host migration), configuration information, and an audio session ID. The audio session ID is a numeric identifier given to the audio protocol by the transport it is using (e.g., the session/transport layer used by the voice layer may assign an audio session ID to each client that joins the audio session). The audio session ID is used to uniquely identify a client within the audio session. The other clients in the audio session receive the PLAYERJOIN message and update their local list of clients (e.g., their local copy of the name table) to include the newly-connected client (block 1310).

If the session is peer-to-peer the server then sends a "NAMETABLE" message to the client. The NAMETABLE message contains a list of the clients who are currently in the audio session, including configuration information about those clients (host order ID and audio session Ids for each node in the session). Receipt of the NAMETABLE message finalizes the new client's connection to the session (block 1312). In the case where the audio session has a client/server topology, a NAMETABLE message is typically not sent to the newly connected client, since clients generally do not store a copy of the name table in client/server topologies.

Disconnection

Disconnection is the process by which a client node that is a member of an audio session disconnects from that session. All messages related to the disconnection process are preferably sent by guaranteed delivery.

Figure 14:
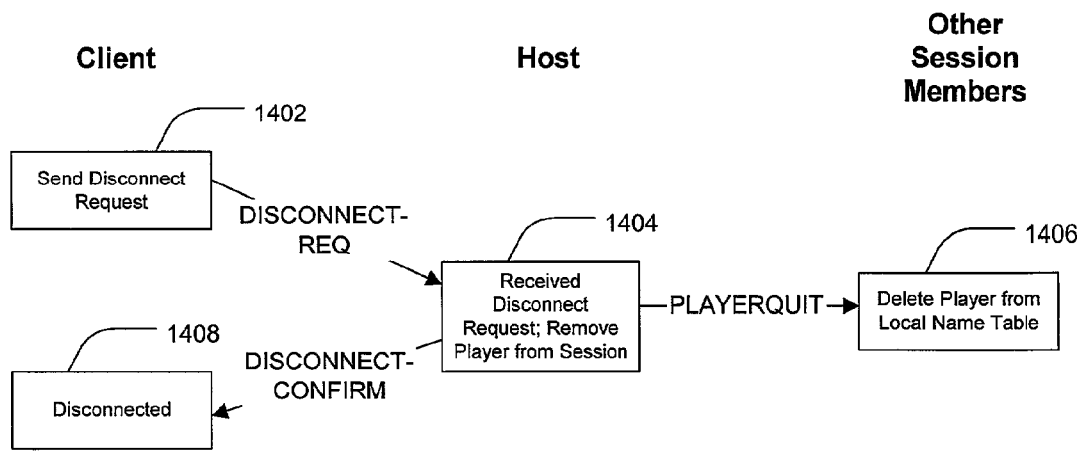
FIG. 14 is a diagram of an exemplary process of disconnecting from a session, in accordance with aspects of the invention.

An exemplary disconnection process is shown in FIG. 14. A client node initiates the process of disconnecting from an audio session by sending the host a disconnection request ("DISCONNECTREQ") message (block 1402), which is received by the host (block 1404). If the session is peer-to-peer, then the host sends the other clients in the session a message indicating that the client is disconnecting from the session. (In the example of FIG. 14 where the audio session is a voice session between players in a multi-player game, the message that is sent to the other clients in the session is labeled "PLAYERQUIT." However, it will be understood that this label is merely exemplary, and any message may be sent which indicates to other members of the session that the disconnecting client is leaving the session.) The exemplary PLAYERQUIT message preferably contains a "reason code" for the disconnection as well as the audio session ID of the disconnecting client. For example, the reason code may indicate "success" in the case where a client leaves the session upon its own request. However, if the client disconnects abnormally in a peer-to-peer session, then the host sends all of the other clients in the session a PLAYERQUIT message with a reason code indicating "connection lost." Upon receiving the PLAYERQUIT message (block 1406), the other clients in the audio session delete the disconnecting client from their respective local copies of the name table Upon receiving the DISCONNECTREQ message from the disconnecting client, the host responds to the disconnecting client with a confirmation message ("DISCONNECTCONFIRM"). Once the client receives the DISCONNECTCONFIRM message, it is disconnected from the voice session (block 1408). It should be noted that if a server receives a DISCONNECTREQ message from any client, it responds with a DISCONNECTCONFIRM message regardless of whether it knows about the client. This is to handle a condition where the host leaves the session after a client has sent a DISCONNECTREQ.

Transmission of Audio Data

Figure 15:
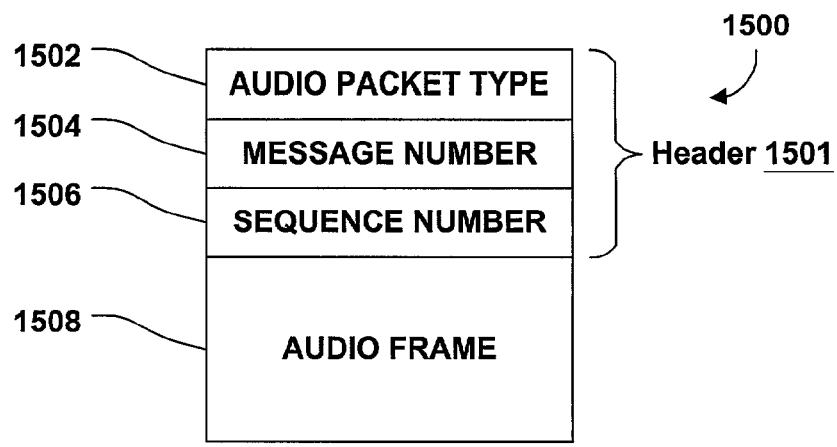
FIG. 15 is a block diagram of an exemplary audio packet data structure.

Audio data is transmitted from one member of an audio session to another in the form of an audio packet. FIG. 15 shows an exemplary format for an audio packet 1500. Audio packet 1500 comprises a header 1501 followed by a frame of audio data 1508. In a preferred embodiment of the invention, audio data 1508 is compressed, although it should be appreciated that an audio packet may contain uncompressed audio. Header 1501 comprises fields for audio packet type 1502, message number 1504, and sequence number 1506.

The audio packet "type" contained in field 1502 indicates the packet type from among several types of packets. Preferably the packet type is one of the following:

SPEECH: Audio packets of this type are used for echo sessions to send audio data from the client to the host and for peer-to-peer sessions between clients. Packets of type SPEECH do not indicate the destination for the audio data. Since SPEECH packets are used only for echo and peer-to-peer sessions, such destination data is unnecessary in such a packet: in an echo session, the only destination is the host; in a peer-to-peer session, the sender directs the package to its recipient at the time of sending, so it is unnecessary for the packet to carry information about its destination.

SPEECHBOUNCE: Audio packets of this type are used for echo sessions to send audio data from the client to the host, and for mixing sessions to send packets from the server to clients.

SPEECHWITHTARGET: Audio packets of this type are used when sending audio data from clients to servers in forwarding and mixing sessions. The header of this type of packet includes one or more audio session IDs, which identifies the destination(s) of the audio packet. Thus, when a first client in a forwarding or mixing session sends audio data to a second client, the first client packages the audio data in a SPEECHWITHTARGET packet that indicates the audio session ID of the destination node, and sends the packet to the host. The host then routes the audio data to the second client based on the audio session ID indicated in the packet header. (In a mixing session, the data destined for the second client may be mixed with other data destined for the second client.)

SPEECHWITHFROM: Audio packets of this type are used to send audio data from a host to a client in a forwarding session. The header of this type of packet includes an audio session ID that indicates the source of the audio data. The clients in a forwarding session use this audio session ID to determine the origin of the audio data. Since clients in a forwarding session receive data only from the server, the packet's return address (i.e., the address of the server) does not identify the true origin of the packet. In a forwarding session, audio data received from a server in the form of a SPEECHWITHTARGET packet may be repackaged in a SPEECHWITHFROM packet before being sent to the destination client.

Message number 1504 indicates which "message" an audio packet is a part of. Messages may be delimited in various ways. In the case where the audio data to be transmitted over a network is speech, a message may, for example, be defined as a single sequence of unbroken speech: the current message ends when the speaker pauses, and a new message begins when the speaker resumes speaking. (When messages are delimited by pauses, one optimization that may reduce the number of messages transmitted is to allow a message to contain a pre-determined number of pauses, or to require that a pause be a minimum duration—e.g., one second, although the optimal duration depends on the type of compression used.) Each delimited message is assigned a message number, typically in a sequence where the first message is number zero. A message may be transmitted in more than one packet; each packet 1500 that contains audio data from a given message includes that message's number in message number field 1504.

Sequence number 1506 indicates a packet's position in the sequence of packets used to transmit a message. Each packet in a message is assigned a sequence number, which is included in header 1501 of audio packet 1500. Thus, when a message is transmitted using more than one packet, sequence number 1506 can be used to reconstruct a voice message from its component packets. Sequence numbers preferably start at zero for the first packet in a voice message and increment by one for each subsequent packet. Sequence numbers may "wrap" after a certain value has been reached.

Audio data may be lost, received out of order or duplicate packets may be received. The data in packet header 1501 (e.g., message number 1504 and sequence number 1506) allows a voice engine to handle all of these cases.

General Messages

A protocol for an audio layer may include a miscellaneous set of messages, as described below. These messages support various "housekeeping" tasks in the functioning of the audio layer:

SESSIONLOST: This message is sent to clients to inform them that an unrecoverable error has occurred and the audio session is ending. All clients should disconnect automatically from the audio session when this message is received.

SETTARGET: This message instructs the client to change its list of targets to match the contents of the packet. The message contains a list of audio session IDs signifying the new target list.

Host Migration

As previously described, every session has a host. When a host leaves the session, another node in the session must become the host. Host migration is the process by which another node becomes the host when the host leaves the session. The host migration technique provided by the invention uses a "host election algorithm." The host election algorithm deterministically identifies a host based on which nodes are in a session. The premise of using a host election algorithm is that every node in a session uses the same algorithm, and thus each node in the session, acting independently, can identify the same host by running the host election algorithm.

Figure 16:
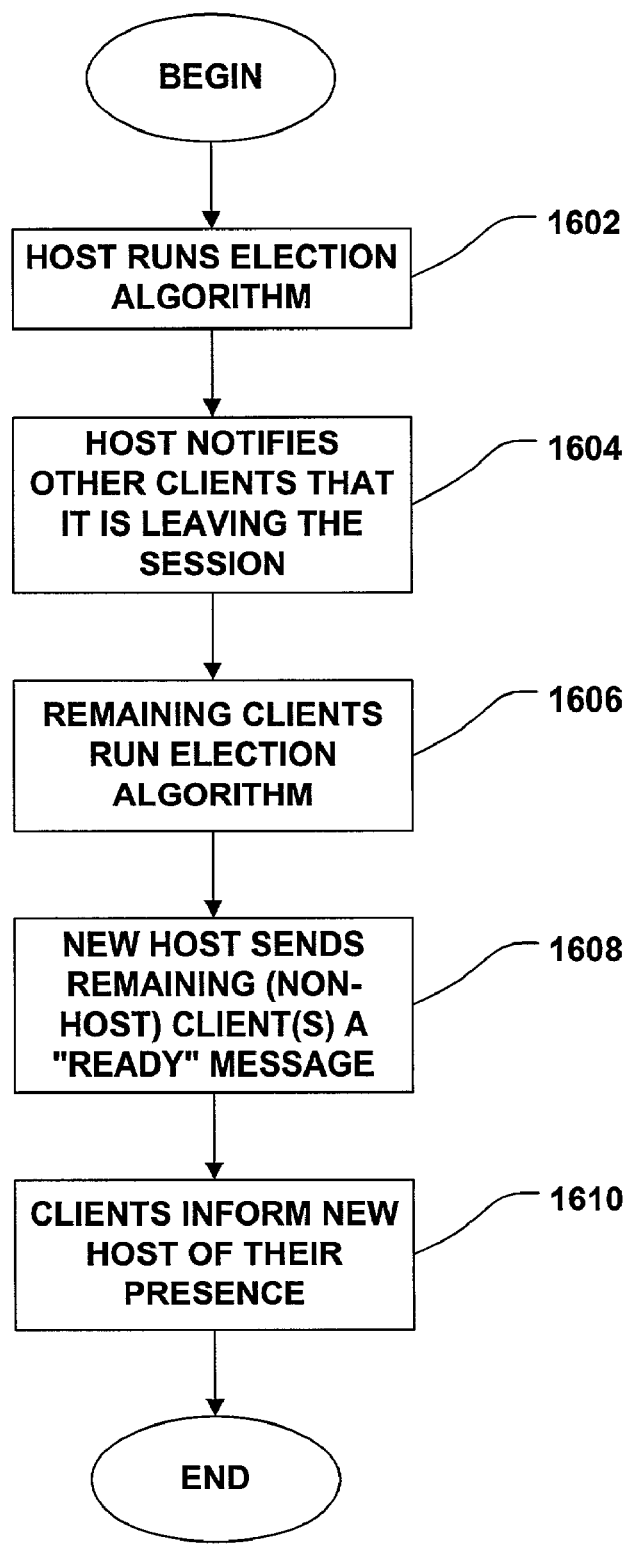
FIG. 16 is a flow diagram of an exemplary host migration process.

FIG. 16 shows an exemplary process for host migration. At step 1602, the current host runs the host election algorithm. The purpose of the host's running the host election algorithm is to determine whether any node would be elected as the new host upon the current host's leaving session. For example, if the host is the last node in the session, then no host would be elected upon the current host's departure. If there would be no new host, then the host sends a "session lost" message, in order to inform any node that might be joining the session at that time that the host is leaving. If the election algorithm determines that there would be a new host, then the current host sends all of the remaining nodes a message indicating the current host's departure (step 1604).

In response to receiving the message sent at step 1604, each of the remaining clients runs the host election algorithm (step 1606). As noted above, since each client uses the same host election algorithm, each client will independently identify the same node as the new host. In one example, each node is assigned a "host order ID" at the time the node joins the session. Such a host order ID is a sequence number that indicates the node's order of preference to become the host. Thus, the host election algorithm may be to use the node having the lowest host order ID among all of the nodes that remain in the session. It will be understood, however, that using a host order ID in this manner is merely exemplary, and any host election algorithm that deterministically identifies the host may be used without departing from the spirit and scope of the invention.

At step 1608, the node that has been identified as the new host by the host election algorithm sends the other remaining nodes a message indicating that it is ready to take over as the new host. At step 1610, the remaining non-host nodes send the host a message in order to confirm their presence.

Figure 16A:
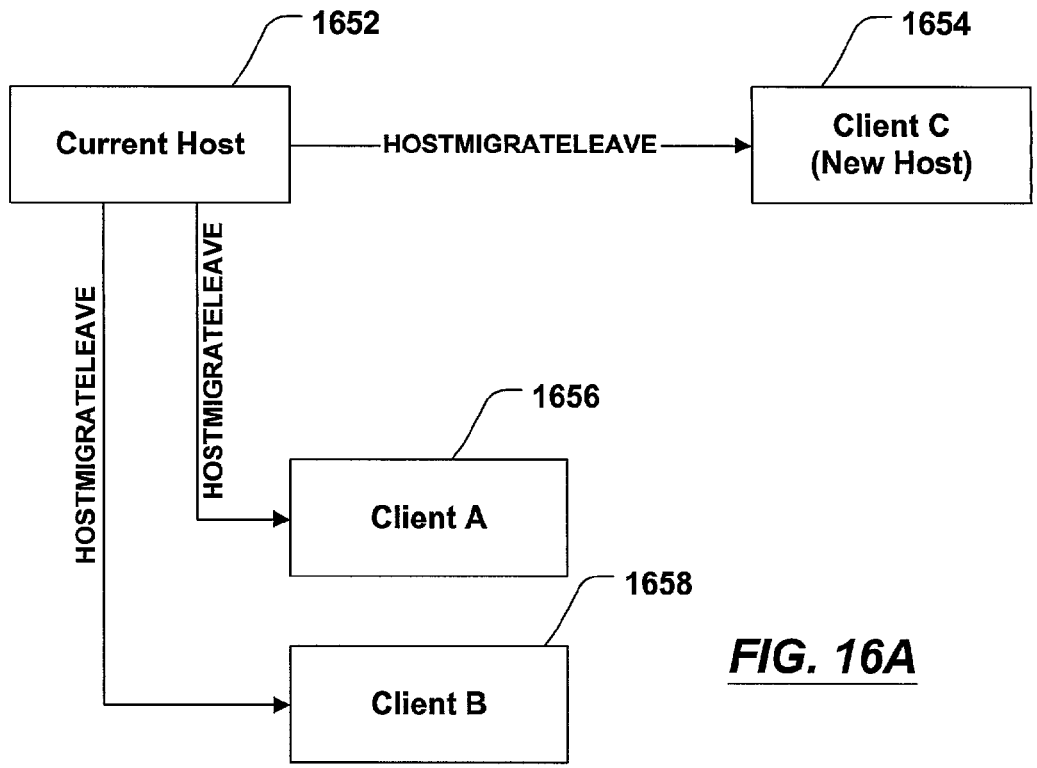
FIGS. 16A-D are diagrams of the various stages of host migration.

FIGS. 16A-16D show the various stages of the host migration process. In FIG. 16A, exiting host 1652 sends a message ("HOSTMIGRATELEAVE") to all other nodes 1654, 1656 and 1658 in the session. As noted above, if exiting host 1652 determines that there are no nodes left to take over as host, then host 1652 does not send a HOSTMIGRATELEAVE message, but does send a "session lost" message.) If host 1652 exited abnormally (e.g., if the host abruptly disconnected before it could send a HOSTMIGRATELEAVE message), then the transport layer will detect that host 1652 has exited and inform the remaining nodes 1654, 1656 and 1658.

Figure 16B:
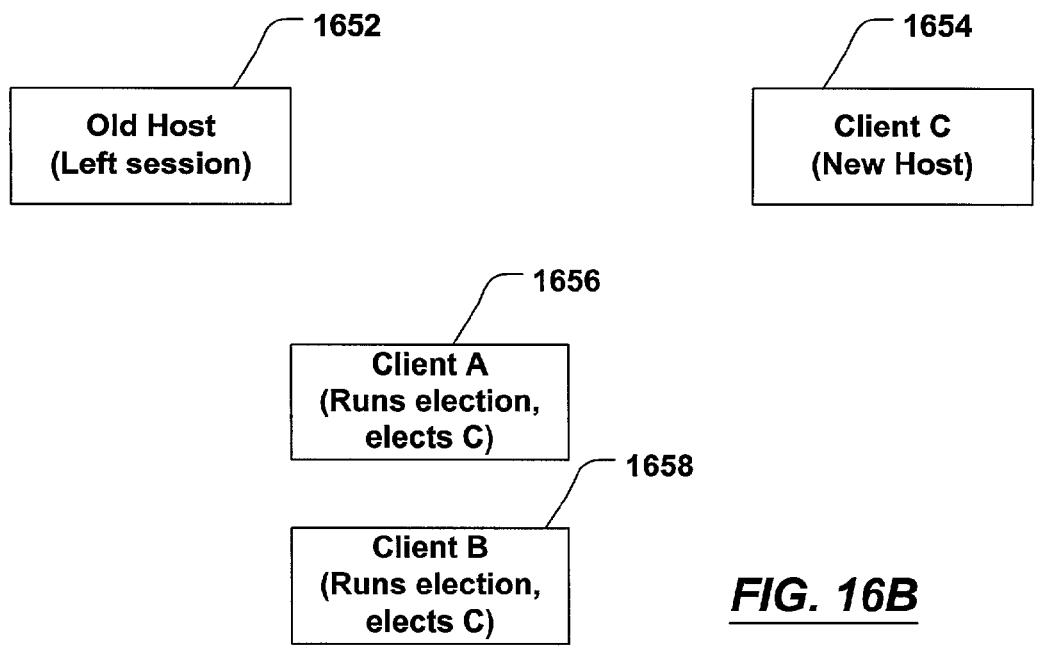

In FIG. 16B, host 1652 is disconnected from the session, and nodes 1654, 1656, and 1658 run the host election algorithm. The host election algorithm selects the new host, e.g., by selecting the remaining node with the lowest host order ID. The new host discovers that it is the new host by running this algorithm. In the example of FIG. 16B, node 1654 is the newly-elected host.

Figure 16C:
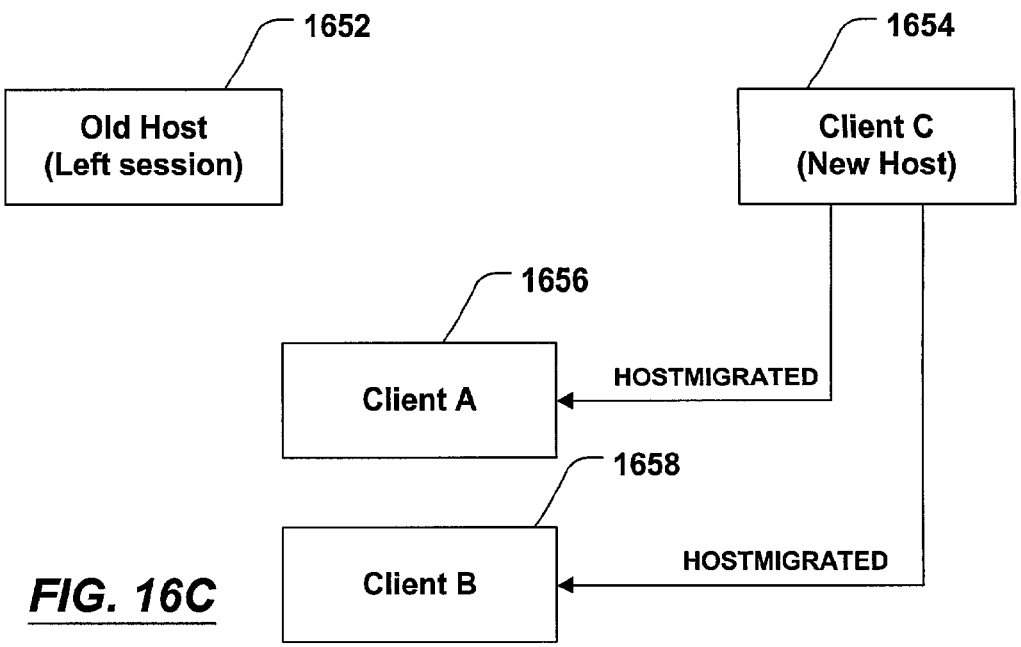

In FIG. 16C, new host 1654 has initialized itself as host, and sends a message ("HOSTMIGRATED") to the remaining non-host nodes 1656 and 1658 to indicate that it is ready to be the new host.

Figure 16D:
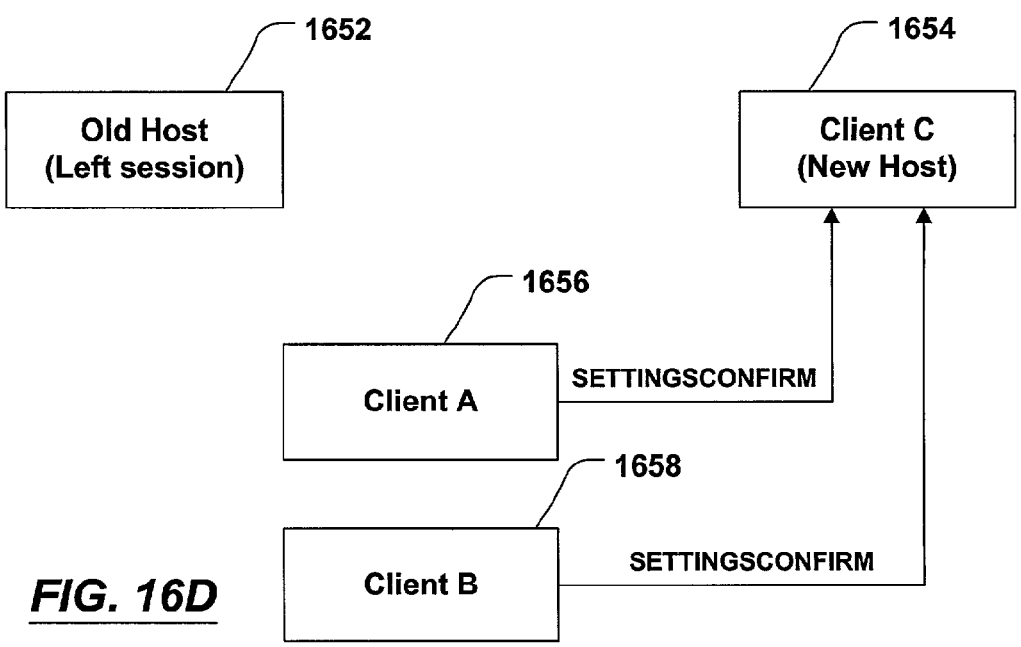

In FIG. 16D, the clients have received the HOSTMIGRATED message and respond with a SETTINGSCONFIRM message. The SETTINGSCONFIRM message is similar to the SETTINGSCONFIRM message discussed above and shown in FIG. 13 in relation to the connection process. However, where the SETTINGSCONFIRM message is issued during host migration by a client who is already in the session, the client's SETTINGSCONFIRM message includes the client's host order ID, which indicates to the new host that the new host should not assign a new host order ID to the existing client node. The host then runs the portion of the connection process that begins as step 4 (shown in FIG. 13)—i.e., by issuing PLAYERJOIN and NAMETABLE messages. If a client is connecting during a host migration process, the new client re-sends its SETTINGSCONFIRM message to the newly elected host; this allows a client to connect even if the host changes during the connection. Any new clients who connect after a host migration are given a host order ID that is offset by the client's host order ID when it was elected. The purpose of using an "offset" value is to ensure that newly-added session members are always assigned higher host order IDs than nodes that are already in the session. Thus, the "offset" from the current host's host order ID is chosen to be large enough so that it is unlikely that a newly assigned host order ID will be lower than any existing host order ID in the session.

Communication Between Session/Transport Layer and Audio Layer

Figure 17:
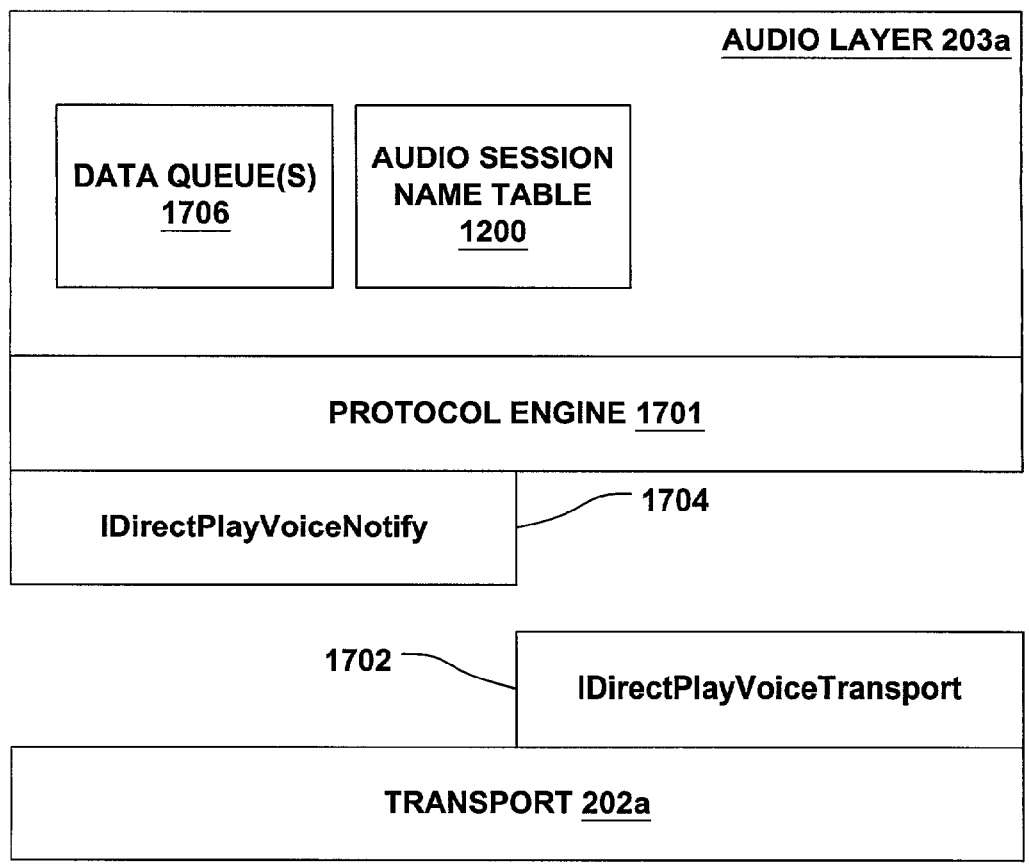
FIG. 17 is a block diagram of a voice engine and session/transport which communicate through a set of APIs.

FIG. 17 shows an example of an audio layer that uses a transport layer to send and receive audio data. Communication between the audio layer and the transport layer, in this example, is provided by a set of APIs exposed by the audio layer and transport layer, respectively.

Audio layer 203*a* includes a protocol engine 1701, one or more data queues 1706, and a name table 1200. Protocol engine 1701 contains the functionality to engage in the various aspects of the "protocol for an audio layer," as described above. For example, protocol engine 1701 generates and receives the various messages related to connection, disconnection, host migration, etc. Data (e.g., audio data captured with a microphone) is provided to protocol engine 1701 for delivery to other nodes in an audio session. Name table 1200 includes a list of members of an audio session, as described above in connection with FIG. 12. Data queue(s) 1706 buffer data received from other nodes, so that such data may be rendered over a sound rendering system. Audio layer 203*a* exposes an API 1704, which in the example of FIG. 17 is named "IDirectPlayVoiceNotify." API 1704 is called by transport layer 202*a* to communicate events (e.g., the arrival of data) to audio layer 203*a*.

Session/transport layer 202*a* is a data transport which is used by audio layer 203*a* to send and receive audio data and audio session data, as described above. Session/transport layer 202*a* exposes an API 1702, which in the example of FIG. 17 is named "IDirectPlayVoiceTransport." Audio layer 203*a* uses session/transport layer 202*a* by calling API 1702. For example, Audio layer 203*a* may call a method in API 1702 in order to provide session/transport layer 202*a* with a frame of audio data to be sent to another node.

The IDirectPlayVoiceNotify interface (e.g., API 1704) implemented by audio layer 203*a* contains methods to allow session/transport layer 202*a* to inform audio layer 203*a* when important transport level events occur. The types of events that can be generated are described below:

DVEVENT_ADDPLAYER—A new client enters the transport session.

DVEVENT_REMOVEPLAYER—A client is leaving the transport session.

DVEVENT_STOPSESSION—The transport's connection to the session has been lost.

DVEVENT_CREATEGROUP—A group was created in the transport session. (A "group" is an alias for a plurality of session members who can be collectively addressed by a single identifier.)

DVEVENT_DELETEGROUP—A group was destroyed in the transport session.

DVEVENT_ADDPLAYERTOGROUP—Indicates that a player has been added to a group.

DVEVENT_REMOVEPLAYERFROMGROUP—Indicates that a player has been removed from a group.

DVEVENT_SENDCOMPLETE—The session/transport layer has completed transmitting a packet sent by audio layer 203*a*. See the section on IDirectPlayVoiceTransport below for more details.

DVEVENT_MIGRATEHOST—The session host has left the audio session and a client in the session has been elected the new host.

When these events occur data transport layer 202*a* calls into audio layer 203*a* through the IDirectPlayVoiceNotify::NotifyEvent function. Audio layer 203*a* then handles the event and returns.

Additionally, the IDirectPlayVoiceNotify interface is used to inform audio layer 203*a* that data has arrived that it is audio-layer specific. The session/transport layer 202*a* strips any transport specific headers/footers from the audio data before giving it to audio layer 203*a*. This result is that audio layer 203*a* does not have to perform any additional processing to determine the contents of a data packet. The DirectPlayVoice API (described below in Appendix A) provides an implementation of the specified interface.

The IDirectPlayVoiceTransport API (e.g., API 1702) preferably provides the following functions to the voice engine:

Advise—This function is used to link the audio layer 203*a* and session/transport layer 202*a*.

UnAdvise—This function is used to detach a link between the audio layer 203*a* and session/transport layer 202*a*.

IsValidEntity—This function checks a DVID to see if it is valid for the transport layer 202*a*. (A DVID is a specific example of an audio session ID, discussed above in connection with FIG. 12.)

IsGroupMember—This function checks to see if the specified DVID is a member of the specified transport group.

GetSessionInfo—Returns information about the configuration of session/transport layer 202*a*. (Peer to Peer vs. Client/Server, Host Migration capabilities, etc.). The information provided to the audio layer by a GetSessioninfo call allows the audio layer to adapt its behavior to the transport layer. The information provided by the GetSessionInfo call is more particularly described in Appendix B below, particularly in the section describing the DVTRANSPORTINFO data structure.

IsValidGroup—Checks the specified DVID to see if it is a valid group.

IsValidPlayer—Checks the specified DVID to see if it is a valid player.

SendSpeech—Sends a buffer of data to the specified DVID via transport layer 202*a*. This function supports synchronous and asynchronous, guaranteed and non-guaranteed sends. If a send is asynchronous then the transport layer notifies the voice engine through the IDirectPlayVoiceNotify::NotifyEvent function when the send has completed.

SendSpeechEx—An extended version of the SendSpeech API call that sends to a list of targets specified as DVIDs.

Exemplary IDirectPlayVoiceTransport and IDirectPlayVoiceNotify interfaces are described in greater detail below in Appendix B.

To support this interface (i.e., API 1702), session/transport layer 202*a* preferably meets the following requirements:

The transport supports both synchronous and asynchronous sends. If a send is asynchronous the transport layer 202*a* must call into the audio layer 203*a* with a DVEVENT_SENDCOMPLETE when the send has completed or failed.

Before the transport layer 202*a* calls into the audio layer 203*a* it preferably adds a reference to the audio layer object. It does so by calling IDirectPlayVoiceNotify::AddRef. When it returns from its call into the audio layer 203a it releases it's reference with a call to IDirectPlayVoiceNotify::Release.

The transport layer 202a provides unique numeric IDs (DVIDs) to identify clients in the session. The audio layer 203a keeps track of players using this numeric identifier and therefore the transport layer 202a must understand them. This eliminates the need for audio layer 203a to store transport specific information to identify clients.

The transport layer 202a must provide both guaranteed and non-guaranteed messaging capabilities.

The transport layer 202a can optionally support groups of clients. These groups of clients must be identifiable by a unique numeric ID (DVID).

The transport layer 202a must have an option to transmit to all members of a session.

The transport layer 202a must support at least one of the following session structures:

Peer to peer—Every client in the session knows about and can send messages directly to every other client in the session.

Client/Server—The session host knows about and can send messages directly to any client in the session. The clients only know about the session host.

The transport layer 202a can optionally support host migration in peer-to-peer sessions.

If these requirements are met then the session/transport layer 202a can implement the IDirectPlayVoiceTransport interface and the audio layer 203a will run on the transport. The DirectPlayVoice API (described below in Appendix A) supports this interface.

In order to start using the interfaces, the audio layer 203a and transport layer 202a must be linked. To perform the link the audio layer 202a must first be given a pointer to the transport layer interface. Give the pointer, the audio layer 203a queries the transport layer 202a, preferably using COM to retrieve the transport layer's IDirectPlayVoiceTransport interface. It then calls the IDirectPlayVoiceTransport::Advise method, which passes transport layer 202a a pointer to audio layer 203a. The transport layer 202a then queries the audio layer 203a, using COM to retrieve the audio layer's IDirectPlayVoiceNotify interface. Once this process is complete the two layers are linked and communication can begin. When the audio layer 203a wishes to disconnect from the transport layer 202a, it uses the IDirectPlayVoiceTransport::UnAdvise method.

The combination of the above two interfaces address provides the following features:

Protocol independence—Because transport layer 202a strips all protocol specific details from incoming data before delivering it to audio layer 203a there is no need to have any protocol specific code.

Transport independence—By limiting all communication with transport layer 202a to the specified interfaces, audio layer 203a can support current and future implementations of any transport (provided that the transport meets the conditions outlined above).

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

APPENDIX A

Exemplary Application Programmer Interface for an Audio Layer

The following is an exemplary Application Programmer Interface (API) for a voice engine as described above. For example, the voice engine may be layer 203 of network 173 in FIG. 2, which uses data transport layer 202 to transport the audio data that is generates. The voice engine may expose the following exemplary API in order to allow applications to use the voice engine. The API includes various functions, structures, and constants. It will be understood that these functions, structures, and constants are merely exemplary; any combination or subset of these components (or equivalent components) is included within the spirit and scope of the invention.

IDirectPlayVoiceClient

Applications use the methods of the IDirectPlayVoiceClient interface to manage clients in a voice session.

The methods of the IDirectPlayVoiceClient interface can be organized into the following groups.

| | |
|---|---|
| Buffer management | Create3DsoundBuffer |
| | Delete3DsoundBuffer |
| Miscellaneous | GetCaps |
| | GetCompressionTypes |
| | GetSoundDeviceConfig |
| | SetNotifyMask |
| Session management | Connect |
| | Disconnect |
| | GetClientConfig |
| | GetSessionDesc |
| | GetTransmitTargets |
| | Initialize |
| | SetClientConfig |
| | SetTransmitTargets |

IDirectPlayVoiceClient::Connect

Connects the client to a Microsoft® DirectPlay® Voice session.

HRESULT Connect(
  PDVSOUNDDEVICECONFIG pSoundDeviceConfig,
  PDVCLIENTCONFIG pdvClientConfig,
  DWORD dwFlags
);

Parameters pSoundDeviceConfig

Pointer to a DVSOUNDDEVICECONFIG structure that describes the sound device configuration.

pdvClientConfig

Pointer to a DVCLIENTCONFIG structure that describes the general configuration of the client.

dwFlags

Flag. You can specify the following flag.

DVFLAGS_SYNC

The method does not return until the operation is completed.

Return Values

If the method is processed synchronously and is successful, it returns DV_OK. By default, this method is run asynchronously and returns DVERR_PENDING. On error, this method will return one of the following values.

DVERR_ALREADYPENDING

DVERR_COMPRESSIONNOTSUPPORTED

DVERR_INCOMPATIBLEVERSION

DVERR_INVALIDBUFFER

DVERR_INVALIDDEVICE

DVERR_INVALIDFLAGS

DVERR_INVALIDOBJECT

DVERR_INVALIDPARAM

DVERR_INVALIDPOINTER

DVERR_NOTINITIALIZED

DVERR_OUTOFMEMORY

DVERR_RUNSETUP

DVERR_SENDERROR

DVERR_SOUNDINITFAILURE

DVERR_TIMEOUT

DVERR_TRANSPORTNOPLAYER

DVERR_TRANSPORTNOSESSION

DVERR_CONNECTED

DVERR_NOVOICESESSION

Remarks

You must test the sound devices selected for playback and capture by invoking the setup wizard before connecting the client to the DirectPlay Voice session. On application startup, check the audio configuration by using IDirectPlayVoiceTest::CheckAudioSetup. If this method returns DVERR_RUNSETUP, the sound configuration specified has not been tested. The setup wizard needs to be run only once for any configuration.

If you specify a buffer that is not the right format, the method will return DVERR_INVALIDBUFFER.

If the buffer or a portion of the buffer is locked when DirectPlay Voice attempts to write to it, the method will return DVERR_INVALIDBUFFER, and DirectPlay Voice will disconnect from the session. You will also receive a DVMSGID_SESSIONLOST message. The hResult member of the associated structure will be set to DVERR_LOCKEDBUFFER. Subsequent method calls will return a DVERR_NOTCONNECTED error code.

If full duplex operation is not supported, DirectPlay Voice falls back to half duplex (listen only) mode. To determine if you are in half-duplex mode, call IDirectPlayVoiceClient::GetSoundDeviceConfig after you have completed the connection. If you are in half-duplex mode, the dwFlags member of the DVSOUNDDEVICECONFIG structure will have the DVSOUNDCONFIG_HALFDUPLEX flag set.

Regardless of how the interfaces are obtained, the DirectPlayVoiceClient object maintains a reference, through a call to AddRef, to the IDirectSound and IDirectSoundCapture interfaces it uses until IDirectPlayVoiceClient::Disconnect is called. When Disconnect is called, the DirectPlayVoiceClient object calls Release on both interfaces.

If this method is called synchronously by setting the DVFLAGS_SYNC flag, the DVMSG_CONNECTRESULT message is not sent to the message handler. In this case, the connection result is determined by the return value of this method.

If this method is called asynchronously (by default), calling this method immediately returns a DVERR_PENDING error value and proceeds to process the connection request in the background. The status of the connection is not be known until the DirectPlay Voice client generates a DVMSG_CONNECTRESULT message with the connection result.

Any calls to IDirectPlayVoiceClient::Connect while a connection is pending return DVERR_ALREADYPENDING. Additionally, only one connection can be pending at a time.

A transport session must be started on the specified DirectPlay object before calling this method. A successful call to IDirectPlayVoiceClient::Initialize must be made before calling the Connect method.

IDirectPlayVoiceClient::Create3DSoundBuffer

Retrieves a 3-D sound buffer for a player or group. You can use the methods of the 3-D sound buffer object to change the virtual 3-D position of incoming voice transmissions from the specified group or player.

HRESULT Create3DSoundBuffer(
  DVID dvID,
  LPDIRECTSOUNDBUFFER lpdsSourceBuffer,
  DWORD dwPriority,
  DWORD dwFlags,
  LPDIRECTSOUND3 DBUFFER* lpUserBuffer
);

Parameters dvID

Variable of type DVID that specifies the identification of the player or group that the user wants to reserve a buffer for. You can also specify DVID_REMAINING to create a 3-D user buffer for all players or groups that do not have a user buffer. If DVID_REMAINING is specified, the lpdsBufferDesc must be NULL and the dwPriority and dwFlags parameters must be set to 0.

lpdsSourceBuffer

Pointer to an IDirectSoundBuffer interface, which is used to create the Microsoft® DirectPlay® Voice main buffer. This can be either NULL or a user-created Microsoft DirectSound® buffer. If this member is set to NULL, then DirectPlay Voice creates a buffer for you.

dwPriority

Direct pass-through. This value is passed in the dwPriority parameter when the call to IDirectSoundBuffer::Play is made. For more information, see IDirectSoundBuffer8::Play, which is publicly available in the document of Microsoft® DirectX®. This parameter must be 0 if lpdsMainBufferDesc is NULL.

dwFlags

Direct pass-through. This value is passed to the dwFlags parameter when the call to IDirectSoundBuffer::Play is made. For more information, see IDirectSoundBuffer8::Play, which is publicly available in the document of Microsoft® DirectX®. This parameter must be 0 if lpdsMainBufferDesc is NULL.

lpUserBuffer
    Pointer to memory where the reserved buffer is placed.

Return Values
    Returns DV_OK if successful, or one of the following error values.

DVERR_ALREADYBUFFERED

DVERR_INVALIDOBJECT

DVERR_INVALIDPARAM

DVERR_INVALIDPOINTER

DVERR_NOTALLOWED

DVERR_NOTCONNECTED

DVERR_NOTINITIALIZED

DVERR_OUTOFMEMORY

DVERR_SESSIONLOST

Remarks
    If the DirectPlay voice session is a mixing server session, this method fails and returns DVERR_NOTALLOWED.
    Although you can access all the member functions of the 3-D sound buffer object, because the DirectPlay voice client uses the buffer to stream incoming audio, do not use the Lock, UnLock, or Play methods of the DirectSound3 DBuffer object.
    If the user specifies a buffer, DirectPlay uses that buffer for the player's or group's buffer. User-created buffers have the following restrictions.
    The buffer must be 22 kilohertz, 16-bit, Mono format.
    The buffer must be at least 1 second in length.
    The buffer must have been created with the DSBCAPS_GETCURRENTPOSITION2 and DSBCAPS_CTRL3D flags.
    The buffer must not be a primary buffer.
    The buffer must not be playing when it is passed to DirectPlay.
    If the buffer is not the right format, the method will return DVERR_INVALIDBUFFER.
    The buffer must not be locked when you pass it to DirectPlay. When the buffer for the individual user is no longer required or when a player leaves the voice session, it is important to call IDirectPlayVoiceClient::Delete3DSoundBuffer to free up resources.
    If the buffer or a portion of the buffer is locked when DirectPlay Voice attempts to write to it, the method will return DVERR_INVALIDBUFFER. If you lock the buffer after the method has returned, you will receive a DVMSGID_SESSIONLOST message. The hResult member of the associated structure will be set to DVERR_LOCKEDBUFFER. Subsequent method calls will return a DVERR_NOTCONNECTED error code.

IDirectPlayVoiceClient::Delete3DSoundBuffer
    Returns exclusive control of the 3-D sound buffer object to the Microsoft® DirectPlay® voice client object.

HRESULT Delete3DSoundBuffer(
    DVID dvID
    LPDIRECTSOUND3 DBUFFER*lpUserBuffer
);

Parameters dvID
    DVID of the player or group that the user wants to delete a buffer for.

lpUserBuffer
    Pointer to the user buffer to delete. This must be a user buffer obtained through the IDirectPlayVoiceClient::Create3DSoundBuffer method.

Return Values
    Returns DV_OK if successful, or one of the following error values.

DVERR_ALREADYBUFFERED

DVERR_INVALIDOBJECT

DVERR_INVALIDPARAM

DVERR_INVALIDPOINTER

DVERR_NOTALLOWED

DVERR_NOTBUFFERED

DVERR_NOTCONNECTED

DVERR_NOTINITIALIZED

DVERR_SESSIONLOST

Remarks
    If the DirectPlay Voice session is a mixing server session, this method fails and returns DVERR_NOTALLOWED.

IDirectPlayVoiceClient::Disconnect
    Disconnects the Microsoft® DirectPlay® Voice client from the existing DirectPlay Voice session.

HRESULT Disconnect(
    DWORD dwFlags
);

Parameters dwFlags
    Flag. You can specify the following flag.

DVFLAGS_SYNC

Do not return until the operation is completed.

Return Values
    Returns DV_OK if successful, or one of the following error values.

DVERR_ALREADYPENDING

DVERR_CONNECTABORTING

DVERR_INVALIDFLAGS

DVERR_INVALIDPARAM

DVERR_NOTCONNECTED

DVERR_NOTINITIALIZED

DVERR_PENDING

DVERR_SESSIONLOST

DVERR_TIMEOUT

Remarks
    On calling this method, all recording and playback is stopped. If a connection is being processed, it is canceled by this call.

Unless the DVFLAGS_SYNC is specified, calling this method immediately returns a DVERR_PENDING error value and proceeds to process the disconnection request in the background. The status of the disconnection is not known until the DirectPlay Voice client generates a DVMSG_DISCONNECTRESULT message that contains the disconnection result. Only one disconnection can be pending at a time. If you call IDirectPlayVoiceClient::Disconnect while a disconnect is pending, DirectPlay will return a DVERR_ALREADYPENDING error value.

If this method is called synchronously by setting the DVFLAGS_SYNC flag, the method does not return until the Disconnect method completes. The result of the disconnection is the return value from this method. No DVMSGID_DISCONNECTRESULT message is generated.

IDirectPlayVoiceClient::GetCaps

Retrieves the Microsoft® DirectPlay® Voice capabilities.

HRESULT GetCaps(
    PDVCAPS pCaps
);

Parameters pCaps
    Pointer to the DVCAPS structure that contains the capabilities of the DirectPlayVoiceClient object.

Return Values
    Returns DV_OK if successful, or one of the following error values.

DVERR_INVALIDPARAM

DVERR_INVALIDPOINTER

IDirectPlayVoiceClient::GetClientConfig
    Retrieves the client configuration.

HRESULT GetClientConfig(
    PDVCLIENTCONFIG pClientConfig
);

Parameters pClientConfig
    Pointer to a DVCLIENTCONFIG structure that contains the configuration of the local client.

Return Values
    Returns DV_OK if successful, or one of the following error values.

DVERR_INVALIDPARAM

DVERR_INVALIDPOINTER

DVERR_NOTCONNECTED

DVERR_NOTINITIALIZED

DVERR_SESSIONLOST

Remarks
    Before calling this member, you must set the dwSize member of the DVCLIENTCONFIG structure.
    You can call this method only after a connection is successfully established with a Microsoft® DirectPlay® Voice session.

IDirectPlayVoiceClient::GetCompressionTypes
    Retrieves the available compression types on the system.

HRESULT GetCompressionTypes(
    PVOID pData,
    PDWORD pdwDataSize,
    PDWORD pdwNumElements,
    DWORD dwFlags Parameters pData
    Pointer to buffer that receives an array of DVCOMPRESSIONINFO structures, one structure for every compression type supported through this object.

pdwDataSize
    Pointer to a DWORD that contains the size of the buffer, in bytes, passed in the pData parameter.

pdwNumElements
    Pointer to a DWORD where the method writes the number of elements returned in the array of DVCOMPRESSIONINFO structures. This contains the number of structures only if the buffer specified in the pData is large enough to hold the information.

dwFlags
    Reserved. Must be 0.

Return Values
    Returns DP_OK if successful, or one of the following error values.

DVERR_BUFFERTOOSMALL

DVERR_INVALIDFLAGS

DVERR_INVALIDPARAM

DVERR_INVALIDPOINTER

Remarks
    If the buffer passed is not large enough to store the list of compression types, the method returns DVERR_BUFFERTOOSMALL and the pdwDataSize parameter is set to the minimum required size.

IDirectPlayVoiceClient::GetSessionDesc
    Retrieves the session properties.

HRESULT GetSessionDesc(
    PDVSESSIONDESC pvSessionDesc
);

Parameters pvSessionDesc
    Pointer to a DVSESSIONDESC structure to receive the session description.

Return Values
    Returns DV_OK if successful, or one of the following error values.

DVERR_INVALIDPARAM

DVERR_INVALIDPOINTER

DVERR_NOTCONNECTED

DVERR_NOTINITIALIZED

DVERR_SESSIONLOST

Remarks
    Before calling this method, make sure to set the dwSize member of the DVSESSIONDESC structure.

This method may be called only after a connection is successfully established with a Microsoft® DirectPlay® Voice session.

IDirectPlayVoiceClient::GetSoundDeviceConfig

Retrieves the sound device configuration of the session.

HRESULT GetSoundDeviceConfig(
    PDVSOUNDDEVICECONFIG pSoundDeviceConfig,
    PDWORD pdwSize
);

Parameters pSoundDeviceConfig

Pointer to a DVSOUNDDEVICECONFIG structure that is filled with the configuration of the sound device.

pdwSize

Pointer to a DWORD that specifies the size of the buffer in pSoundDeviceConfig parameter. If the buffer is too small, the method returns DVERR_BUFFERTOOSMALL and this parameter contains the size of the required buffer.

Return Values

Returns DV_OK if successful, or one of the following error values.

DVERR_INVALIDPARAM

DVERR_INVALIDPOINTER

DVERR_NOTCONNECTED

DVERR_NOTINITIALIZED

DVERR_SESSIONLOST

Remarks

You can call this method only after a connection is successfully established with a Microsoft® DirectPlay® Voice session.

IDirectPlayVoiceClient::GetTransmitTargets

Retrieves the transmit targets, if any, of the voice stream from this client.

HRESULT GetTransmitTargets(
    PDVID pdvIDTargets,
    PDWORD pdwNumTargets,
    DWORD dwFlags
);

Parameters pdvIDTargets

Member to fill with an array of DVIDs that specify the targets that were set by the IDirectPlayVoiceClient::SetTransmitTargets or IDirectPlayVoiceServer::SetTransmitTargets method. You can retrieve the number of targets by specifying NULL for this parameter.

pdwNumTargets

Number of DVIDs in the array. When you call this method, this should be the same value as the number of targets set in the IDirectPlayVoiceClient::SetTransmitTargets method. If the call is successful, Microsoft® DirectPlay® returns the number of elements written to the pdvIDTargets array.

If pdvIDTargets is NULL, this must be 0.

dwFlags

Reserved. Must be 0.

Return Values

Returns DV_OK if successful, or one of the following error values.

DVERR_BUFFERTOOSMALL

DVERR_INVALIDFLAGS

DVERR_INVALIDPARAM

DVERR_INVALIDPOINTER

DVERR_NOTALLOWED

DVERR_NOTCONNECTED

DVERR_NOTINITIALIZED

Remarks

The value returned in the pdvIDTargets parameter can be player or group DVIDs or the DVID_ALLPLAYERS constant.

If the buffer specified in pdvIDTargets is not large enough to store the list of targets, this method returns DVERR_INVALIDPOINTER and pdwNumTargets is set to the required number of elements.

If there is no target specified, pdwNumTargets is set to 0 and the return value is DV_OK.

IDirectPlayVoiceClient::Initialize

Initializes the DirectPlayVoiceClient object by associating it with a DirectPlay object. Additionally, this method registers a message handler with the DirectPlayVoiceClient object.

This method must be called successfully before IDirectPlayVoiceClient::Connect method is called.

HRESULT Initialize(
    PVOID pVoid,
    PDVMESSAGEHANDLER pMessageHandler,
    PVOID pUserContext,
    PDWORD pdwMessageMask,
    DWORD dwMessageMaskElements
);

Parameters pVoid

Pointer to the IUnknown interface for the DirectPlay object that this DirectPlayVoiceClient object should use.

pMessageHandler

User-defined callback function that is called when there is a DirectPlayVoiceClient message to be processed. Threads within the DirectPlayVoiceClient object call the callback function, so it will not be called in the context of your process's main thread.

pUserContext

Pointer to an application-defined structure that is passed to the callback function each time the function is called.

pdwMessageMask

Array of DWORDs that contain the message identifiers that you want DirectPlay Voice to send to your callback function. If a message identifier is not specified in this array, it is not sent. Each message identifier should appear only once in the array and only valid message identifiers are allowed. For example, DVMSGID_CONNECTRESULT is not valid for the server interface, but is for the client interface. To enable all messages, specify NULL for this value.

dwMessageMaskElements

Number of elements specified in the pdwMessageMask parameter. If pdwMessageMask is NULL, this must be 0.

Return Values
Returns DV_OK if successful, or one of the following error values.

DVERR_ALREADYINITIALIZED

DVERR_GENERIC

DVERR_INVALIDPARAM

DVERR_INVALIDPOINTER

DVERR_NOCALLBACK   DVERR_TRANSPORTNOTINIT

Remarks
You can call IDirectPlayVoiceClient::SetNotifyMask to change the notify mask during the course of the voice session.

IDirectPlayVoiceClient::SetClientConfig
Sets the client configuration.

HRESULT SetClientConfig(
    PDVCLIENTCONFIG pClientConfig
);

Parameters pClientConfig
Pointer to the DVCLIENTCONFIG structure that contains the configuration description to set.

Return Values
Returns DV_OK if successful, or one of the following error values.

DVERR_INVALIDFLAGS

DVERR_INVALIDPARAM

DVERR_INVALIDPOINTER

DVERR_NOTCONNECTED

DVERR_NOTINITIALIZED

DVERR_SESSIONLOST

Remarks
You can call this method only after a connection is successfully established with a Microsoft® DirectPlay® Voice session.

Calling this method sets all the parameters in the DVCLIENTCONFIG structure. Therefore, to leave a setting unmodified, you must retrieve the current configuration with IDirectPlayVoiceClient::GetClientConfig. Then modify the parameters to change and call IDirectPlayVoiceClient::SetClientConfig.

If the session is running in half duplex, the members of GetClientConfig related to recording are ignored.

IDirectPlayVoiceClient::SetNotifyMask
Specifies which messages are sent to the message handler.

HRESULT SetNotifyMask(
    PDWORD pdwMessageMask,
    DWORD dwMessageMaskElements
);

Parameters pdwMessageMask
Pointer to an array of DWORDs containing the message identifiers that you want Microsoft® DirectPlay® Voice to send to your callback function. If a message identifier is not specified in this array, it is not sent. Each message identifier should appear only once in the array, and only valid message identifiers are allowed. For example, DVMSGID_CONNECTRESULT is not valid for the server interface, but is for the client interface. To enable all messages, specify NULL for this value.

dwMessageMaskElements
Number of elements specified in the pdwMessageMask parameter. If pdwMessageMask is NULL, this must be 0.

Return Values
Returns DV_OK if successful, or one of the following error values.

DVERR_INVALIDPARAM

DVERR_INVALIDPOINTER

DVERR_NOCALLBACK

DVERR_NOTINITIALIZED

IDirectPlayVoiceClient::SetTransmitTargets
Specifies which players and/or groups receive audio transmissions from the local client.

HRESULT SetTransmitTargets(
    PDVID pdvID Targets,
    DWORD dwNumTargets,
    DWORD dwflags
);

Parameters pdvID Targets
Pointer an array of DVIDs that specify your targets. To specify no targets, pass NULL for this parameter. Additionally, this parameter can be set to the following value.

DVID_ALLPLAYERS
The client is targeting all players in the session. This must be the only element in the array.

dwNumTargets
Number of DVIDs in the array. This value cannot exceed 64. If pdvIDTargets is NULL, this must be 0.

dwflags
Reserved. Must be 0.

Return Values
Returns DV_OK if successful, or one of the following error values.

DVERR_INVALIDFLAGS

DVERR_INVALIDPARAM

DVERR_INVALIDPOINTER

DVERR_INVALIDTARGET

DVERR_NOTINITIALIZED

Remarks
For Microsoft® DirectX® 8.0, the number of individual targets that you can transmit to is limited to 64. If you exceed this value, the method will fail, and return DVERR_NOTALLOWED. However, you can transmit to more than 64 players. To do so, form the players into groups, and then use the group as your target.

The pdvIDTargets parameter specifies an array of player and/or group DVIDs. There must be no duplicate targets in this parameter, and all entries must be valid DVIDs. If a target contains a player as its individual DVID and through a group that the target belongs to, Microsoft® DirectPlay® Voice ensures duplicate speech packets are not sent to the player.

If the session was created with the DVSESSION_SERVERCONTROLTARGET flag, only the server can set the targets for this local client. A call to this method returns DVERR_NOTALLOWED.

IDirectPlayVoiceServer

Applications use the methods of the IDirectPlayVoiceServer interface to manage the host of the voice session.

The methods of the IDirectPlayVoiceServer interface can be organized into the following groups.

| | |
|---|---|
| Miscellaneous | GetCaps |
| | GetCompressionTypes |
| | SetNotifyMask |
| Session management | GetSessionDesc |
| | GetTransmitTargets |
| | Initialize |
| | SetSessionDesc |
| | SetTransmitTargets |
| | StartSession |
| | StopSession |

IDirectPlayVoiceServer:: GetCaps

Retrieves the capabilities of the Microsoft® DirectPlay® Voice server for this system.

HRESULT GetCaps(

PDVCAPS pDVCaps

);

Parameters pDVCaps

Pointer to the DVCAPS structure that contains the capabilities of the DirectPlayVoiceServer object.

Return Values

Returns DV_OK if successful, or one of the following error values.

DVERR_INVALIDOBJECT

DVERR_INVALIDPARAM

DVERR_INVALIDPOINTER

IDirectPlayVoiceServer::GetCompressionTypes

Retrieves available compression types for the system.

HRESULT GetCompressionTypes(
    PVOID pData,
    PDWORD pdwDataSize,
    PDWORD pdwNumElements,
    DWORD dwFlags

);

Parameters pData

Pointer to the buffer that receives an array of DVCOMPRESSIONINFO structures that describe the compression types supported by this object.

pdwDataSize

Pointer to a DWORD that contains the size of the buffer, in bytes, passed in the pData parameter.

pdwNumElements

Pointer to a DWORD where the method writes the number of elements returned in the array of DVCOMPRESSIONINFO structures.

dwFlags

Reserved. Must be 0.

Return Values

Returns DV_OK if successful, or one of the following error values.

DVERR_BUFFERTOOSMALL

DVERR_INVALIDFLAGS

DVERR_INVALIDPARAM

DVERR_INVALIDPOINTER

Remarks

If the buffer is not large enough to store the list of compression types, the method returns DVERR_BUFFERTOOSMALL and the pdwDataSize parameter is set to the minimum required size.

IDirectPlayVoiceServer::GetSessionDesc

Retrieves the Microsoft® DirectPlay® Voice session settings.

HRESULT GetSessionDesc(
PDVSESSIONDESC pvSessionDesc

);

Parameters pvSessionDesc

Pointer to a DVSESSIONDESC structure to receive the session description.

Return Values

Returns DV_OK if successful, or one of the following error values.

DVERR_INVALIDOBJECT

DVERR_INVALIDPARAM

DVERR_INVALIDPOINTER

DVERR_NOTHOSTING

DVERR_NOTINITIALIZED

DVERR_SESSIONLOST

Remarks

Before calling this method, make sure to set the dwSize member of the DVSESSIONDESC structure.

A successful call to IDirectPlayVoiceServer::StartSession must be made before this method can be called.

IDirectPlayVoiceServer::GetTransmitTargets

Retrieves the transmit targets, if any, of the voice stream for a player in a session.

RESULT GetTransmitTargets(
    DVID dvSource,
    PDVID pdvIDTargets,
    PDWORD pdwNumTargets,
    DWORD dwflags

);

Parameters dvSource

DVID of the user or group whose target is returned.

pdvIDTargets

Array of DVIDs that specify the current targets of the player or group that were set by the IDirectPlayVoiceServer::SetTransmitTargets method. You can retrieve the number of targets by specifying NULL for this parameter.

pdwNumTargets
Number of DVIDs in the array. When you call this method, this should be the same value as the number of targets set in the IDirectPlayVoiceServer::SetTransmitTargets method. If the call is successful, Microsoft® DirectPlay® returns the number of elements in the pdvIDTargets array.
If pdvIDTargets is NULL, this must be 0.

dwFlags
Reserved. Must be 0.

Return Values
Returns DV_OK if successful, or one of the following error values.

DVERR_BUFFERTOOSMALL

DVERR_INVALIDFLAGS

DVERR_INVALIDPARAM

DVERR_INVALIDPOINTER

DVERR_NOTALLOWED

DVERR_NOTCONNECTED

DVERR_NOTINITIALIZED

Remarks
This method can be used only if the DVSESSION_SERVERCONTROLTARGET flag is specified on creation of the DirectPlay Voice session. If the flag is not specified, this method returns DVERR_NOTALLOWED.

IDirectPlayVoiceServer::Initialize
Initializes the DirectPlayVoiceServer object by associating it with a DirectPlay object. Additionally, this method registers a message handler with this interface.

RESULT Initialize(
    LPVOID lpVoid,
    PDVMESSAGEHANDLER pMessageHandler,
    PVOID pUserContext,
    LPDWORD lpdwMessageMask,
    DWORD dwMessageMaskElements
);

Parameters lpVoid
Pointer to the IUnknown interface for the DirectPlay object that this DirectPlayVoiceServer object should use.

pMessageHandler
User-defined callback function that is called when there is a DirectPlayVoiceClient message to process. A thread within the DirectPlayVoiceClient object calls the callback function, so it is not called in the context of your process's main thread.

pUserContext
Pointer to an application-defined structure that is passed to the callback function each time the method is called.

lpdwMessageMask
Array of DWORDs that contain the message identifiers that you want DirectPlay Voice to send to your callback function. If a message identifier is not specified in this array, it is not sent. Each message identifier should appear only once in the array, and only valid message identifiers are allowed. For example, DVMSGID_CONNECTRESULT is not valid for the server interface but is for the client interface. To enable all messages, specify NULL for this value.

dwMessageMaskElements
Number of elements specified in the lpdwMessageMask parameter. If lpdwMessageMask is NULL, this must be 0.

Return Values
Returns DV_OK if successful, or one of the following error values.

DVERR_ALREADYINITIALIZED

DVERR_GENERIC

DVERR_INVALIDPARAM

DVERR_INVALIDPOINTER

DVERR_NOCALLBACK

DVERR_TRANSPORTNOTINIT

Remarks
You can call IDirectPlayVoiceServer::SetNotifyMask to change the notify mask during the course of the voice session.

IDirectPlayVoiceServer::SetNotifyMask

Specifies which messages are sent to the message handler.

HRESULT SetNotifyMask(
    PDWORD pdwMessageMask,
    DWORD dwMessageMaskElements
);

Parameters pdwMessageMask
Pointer to an array of DWORDs that contain the message identifiers that you want Microsoft® DirectPlay® Voice to send to your callback function. If a message identifier is not specified in this array, it is not sent. Each message identifier should appear only once in the array, and only valid message identifiers are allowed. For example, DVMSGID_CONNECTRESULT is not valid for the server interface but is for the client interface. To enable all messages, specify NULL for this value.

dwMessageMaskElements
Number of elements specified in the pdwMessageMask parameter. If pdwMessageMask is NULL, this must be 0.

Return Values
Returns DV_OK if successful, or one of the following error values.

DVERR_INVALIDPARAM

DVERR_INVALIDPOINTER

DVERR_NOCALLBACK

DVERR_NOTINITIALIZED

IDirectPlayVoiceServer::SetSessionDesc
Sets the session settings.
HRESULT SetSessionDesc(
    PDVSESSIONDESC pSessionDesc
);

Parameters pSessionDesc
Pointer to a DVSESSIONDESC structure that contains the session description.

Return Values
Returns DV_OK if successful, or one of the following error values.

DVERR_INVALIDOBJECT

DVERR_INVALIDPARAM

DVERR_INVALIDPOINTER

DVERR_NOTHOSTING

DVERR_NOTINITIALIZED

DVERR_SESSIONLOST

Remarks

After the Microsoft® DirectPlay® voice session has started, not all the session properties of the DVSESSION-DESC structure can be changed. For more information, see DVSESSIONDESC.

IDirectPlayVoiceServer::SetTransmitTargets

Controls the transmission of audio from the client to the specified members of the session.

HRESULT SetTransmitTargets(
   DVID dvSource,
   PDVID pdvID Targets,
   DWORD dwNumTargets,
   DWORD dwFlags
);

Parameters dvSource
   DVID of the user whose targets are set.

pdvIDTargets
   List of player DVIDs and/or group DVIDs that are the target for audio transmission. To specify no targets, pass NULL for this parameter. Additionally, this parameter can be set to the following value.

DVID_ALLPLAYERS
   This client is targeting all players in the session. This must be the only element in the array.

dwNumTargets
   Number of DVIDs in the array. This value cannot exceed 64. If pdvIDTargets is NULL this must be 0.

dwFlags
   Reserved. Must be 0.

Return Values
   Returns DV_OK if successful, or one of the following error values.

DVERR_INVALIDFLAGS

DVERR_INVALIDPARAM

DVERR_INVALIDPOINTER

DVERR_INVALIDTARGET

DVERR_NOTALLOWED

DVERR_NOTINITIALIZED

Remarks

For Microsoft® DirectX® 8.0, the number of individual targets that you can transmit to is limited to 64. If you exceed this value, the method will fail, and return DVERR_NOTALLOWED. However, you can transmit to more than 64 players. To do so, form the players into groups, and then use the group as your target.

There must be no duplicate targets in this parameter, and all entries must be valid DVIDs. If a target contains a player as its individual DVID and through a group that the target belongs to, Microsoft® DirectPlay® Voice ensures duplicate speech packets are not sent to the player.

This method can be used only if the DVSESSION_SERVERCONTROLTARGET flag is specified on creation of the DirectPlay Voice session. If the flag is not specified, this method returns DVERR_NOTALLOWED.

IDirectPlayVoiceServer::StartSession

Starts an initialized Microsoft® DirectPlay® Voice session within a running DirectPlay transport session. This method must be successfully called before the clients can complete a connection-to-the-voice session.

HRESULT StartSession(
   PDVSESSIONDESC pSessionDesc,
   DWORD dwFlags
);

Parameters pSessionDesc
   Pointer to a DVSESSIONDESC structure that contains the session description.

dwflags
   Reserved. Must be 0.

Return Values
   Returns DV_OK if successful, or one of the following error values.

DVERR_ALREADYPENDING

DVERR_HOSTING

DVERR_INVALIDFLAGS

DVERR_INVALIDOBJECT

DVERR_INVALIDPARAM

DVERR_INVALIDPOINTER

DVERR_NOTINITIALIZED

Remarks

The IDirectPlayVoiceServer::Initialize method must be called before this method is called. The voice session can be hosted on any client in the session if the voice session is peer-to-peer. If the voice session is not peer-to-peer, it must be hosted on the transport client, which is the host of a active transport session.

The DVSESSIONDESC structure contains the type of voice session to start. The type of voice session can have a dramatic effect on the CPU and bandwidth usage for both the client and the server. You can set the guidCT member of DVSESSIONDESC to DPVCTGUID_DEFAULT.

IDirectPlayVoiceServer::StopSession

Stops the Microsoft® DirectPlay® Voice session.

HRESULT StopSession(
   DWORD dwFlags
);

Parameters dwFlags
   Flag. The following flag can be set.

DVFLAGS_NOHOSTMIGRATE
   The host will not migrate regardless of session and transport settings. Use this flag when you want to shut down the voice session completely.

Return Values

Returns DV_OK if successful, or one of the following error values.

DVERR_ALREADYPENDING

DVERR_INVALIDFLAGS

DVERR_INVALIDOBJECT

DVERR_INVALIDPARAM

DVERR_NOTHOSTING

DVERR_NOTINITIALIZED

DVERR_SESSIONLOST

Remarks

This method returns DVERR_ALREADYPENDING if it is called while another thread is processing a StopSession request.

IDirectPlayVoiceTest

Applications use the CheckAudioSetup method of the IDirectPlayVoiceTest interface to test the Microsoft® DirectPlay® Voice audio configuration.

Audio Configuration CheckAudioSetup

IDirectPlayVoiceTest::CheckAudioSetup

Runs the Audio Setup Wizard on the specified devices. This wizard runs a series of tests on the devices to determine if they are capable of full duplex audio and to ensure that the microphone is plugged in and working correctly on the capture device.

```
HRESULT CheckAudioSetup(
    const GUID * pguidPlaybackDevice,
    const GUID * pguidCaptureDevice,
    HWND hwndParent,
    DWORD dwFlags
);
```

Parameters pguidPlaybackDevice

Pointer to the GUID that identifies the playback device to test. If NULL is passed for this parameter, Microsoft® DirectPlay® Voice tests the system default playback device defined by Microsoft® DirectSound®. You can also pass one of the DirectSound® default GUIDs:

DSDEVID_DefaultPlayback

The system default playback device.

DSDEVID_DefaultVoicePlayback

The default voice playback device.

pguidCaptureDevice

Pointer to the GUID that identifies the capture device to test. If NULL is passed for this parameter, DirectPlay Voice tests the system default capture device defined by DirectSound®. You can also pass one of the DirectSound default GUIDs: DSDEVID_DefaultCapture The default system capture device. You can also specify this device by passing a NULL pointer in the device GUID parameter.

DSDEVID_DefaultVoiceCapture

The default voice communications capture device. Typically, this is a secondary device such as a USB headset with microphone.

hwndParent

The test wizard invoked by this method is modal. If the calling application has a window that should be the parent window of the wizard, it should pass a handle to that window in this parameter. If the calling application does not have a window, it can pass NULL. If the DVFLAGS_QUERYONLY flag is specified, this parameter is not used and the application can pass NULL.

dwFlags

Flags. The following flags can be set.

DVFLAGS_QUERYONLY

Audio setup is not run. Instead, the method checks the registry to see if the devices have been tested. If the devices have not been tested, the method returns DVERR_RUNSETUP. If the devices have been tested, the method returns DV_FULLDUPLEX if the devices support full duplex audio, or DV_HALFDUPLEX if the devices do not support full duplex audio.

DVFLAGS_ALLOWBACK

Passing this flag enables the Back button on the wizard's Welcome page. If the user clicks the Back button on the Welcome page, the wizard exits, and CheckAudioSetup returns DVERR_USERBACK.

Return Values

Returns DV_OK, DV_FULLDUPLEX, DV_HALFDUPLEX if successful, or one of the following error values.

DVERR_INVALIDPARAM

DVERR_RUNSETUP

DVERR_INVALIDDEVICE

Remarks

This method contains user interface (UI) elements and displays dialog boxes. If the DVFLAGS_QUERYONLY flag is specified, the tests are not actually run and no UI is raised. Instead, the registry is checked to determine the results of a previous test of these devices.

If the user cancels the wizard, the CheckAudioSetup call returns DVERR_USERCANCEL. The calling application can then handle the situation appropriately. For example, in DirectPlay Voice part of the gaming options control panel application, if the user clicks Cancel, the dialog box displays a message indicating that voice cannot be used because the wizard has been canceled.

This method might return DVERR_INVALIDDEVICE if the device specified does not exist. Also, if you specify the default device and this method still returns this error, then there are no sound devices on the system.

DirectPlay® Voice Messages

The following messages are handled by Microsoft® DirectPlay® voice callback message handlers.

DVMSGID_CONNECTRESULT

Microsoft® DirectPlay® Voice generates the DVMSGID_CONNECTRESULT message when the connect request generated through a call to the IDirectPlayVoiceClient::Connect method has completed. This message is sent only if the Connect method is called asynchronously.

DVMSG_CONNECTRESULT

The DVMSG_CONNECTRESULT structure contains information for the DVMSGID_CONNECTRESULT system message.

```
typedef struct {
  DWORD dwSize;
  HRESULT hrResult;
} DVMSG_CONNECTRESULT, *LPDVMSG_CONNECTRESULT,
*PDVMSG_CONNECTRESULT;
``` dwSize
  Size of the DVMSG_CONNECTRESULT message structure.

hrResult
  Result of the connection attempt.

DVMSGID_CREATEVOICEPLAYER
  Microsoft® DirectPlay® Voice generates the DVMSGID_CREATEVOICEPLAYER message when a new player joins the voice session.
  Upon connecting to a voice session, clients will receive one of these messages for each player in the voice session. These messages are sent only to clients in peer-to-peer voice sessions.
  The host receives these messages when players join the voice session.
  Players do not join the voice session until they have called IDirectPlayVoiceClient::Connect. Therefore, it is possible for a player to be in the transport session but not part of the voice session.

DVMSG_CREATEVOICEPLAYER
  The DVMSG_CREATEVOICEPLAYER structure contains information for the DVMSGID_CREATEVOICEPLAYER system message.

```
typedef struct {
  DWORD dwSize;
  DVID dvidplayer;
  DWORD dwFlags;
  PVOID pvPlayerContext;
} DVMSG_CREATEVOICEPLAYER, *LPDVMSG_CREATEVOICEPLAYER, *PDVMSG_CREATEVOICEPLAYER;
``` dwSize
  Size of the this message structure.

dvidplayer
  DVID of the player who connected.

dwFlags
  Flag specifying information about the player:

DVPLAYERCAPS_HALFDUPLEX
  The specified player is running in half duplex mode. The player will only be able to receive voice, not transmit it.

DVPLAYERCAPS_LOCAL
  The player is the local player.

pvPlayerContext
  Player context value for the player in the voice session. This value is set through this parameter when this message is received.

DVMSGID_DELETEVOICEPLAYER
  For clients, Microsoft® DirectPlay® Voice generates the DVMSGID_DELETEVOICEPLAYER message when a player quits the voice session. This message is available only to clients in peer-to-peer voice sessions.
  For the host, Microsoft® DirectPlay® Voice generates the DVMSGID_DELETEVOICEPLAYER message when a player quits the voice session.
  Players do not leave the voice session until they have called IDirectPlayVoiceClient::Disconnect or they have disconnected from the transport session. Therefore, a client might be part of the transport session but not part of the voice session.

DVMSG_DELETEVOICEPLAYER
  The DVMSG_DELETEVOICEPLAYER structure contains information for the DVMSGID_DELETEVOICEPLAYER system message.

```
typedef struct {
  DWORD dwSize;
  DVID dvidPlayer;
  PVOID pvPlayerContext;
} DVMSG_DELETEVOICEPLAYER, *LPDVMSG_DELETEVOICEPLAYER, *PDVMSG_DELETEVOICEPLAYER;
``` dwSize
  Size of the DVMSG_DELETEVOICEPLAYER message structure.

dvidPlayer
  DVID of player who disconnected.

pvPlayerContext
  Pointer to the context value set for the player. This value is set through the pvPlayerContext member of the DVMSG_CREATEVOICEPLAYER message structure.

DVMSGID_DISCONNECTRESULT
  Microsoft® DirectPlay® Voice generates the DVMSGID_DISCONNECTRESULT message when the disconnect request generated through a call to the IDirectPlayVoiceClient::Disconnect method has completed. This message is sent only if the Disconnect method is called asynchronously.

DVMSG_DISCONNECTRESULT
  The DVMSG_DISCONNECTRESULT structure contains information for the DVMSGID_DISCONNECTRESULT system message.

```
typedef struct {
  DWORD dwSize;
  HRESULT hrResult;
} DVMSG_DISCONNECTRESULT, *LPDVMSG_DISCONNECTRESULT, *PDVMSG_DISCONNECTRESULT;
``` dwSize
  Size of the DVMSG_DISCONNECTRESULT message structure.

hrResult
  Result of the disconnect request.

DVMSGID_GAINFOCUS
  The DVMSGID_GAINFOCUS message is sent to notify you that you have begun capturing audio. It is sent when an application that has lost capture focus recovers it. There is no data associated with this message. Refer to the Microsoft® DirectSound® documentation for more information on capturing audio.

DVMSGID_HOSTMIGRATED
  Microsoft® DirectPlay® Voice generates the DVMSGID_HOSTMIGRATED message when the voice host has changed.

DVMSG_HOSTMIGRATED

The DVMSG_HOSTMIGRATED structure contains information for the DVMSGID_HOSTMIGRATED system message.

```
typedef struct {
    DWORD      dwSize;
    DVID       dvidNewHostID;
    LPDIRECTPLAYVOICESERVER pdvServerInterface;
} DVMSG_HOSTMIGRATED, *LPDVMSG_HOSTMIGRATED,
*PDVMSG_HOSTMIGRATED;
``` dwSize

Size of the DVMSG_HOSTMIGRATED message structure.

dvidNewHostID

DVID of the new host.

pdvServerInterface

If the local client has become the new voice session host, this member will point to a newly created IDirectPlayVoiceServer object that can be used by the local client for providing host services. If the local client is not the new host, then this member will be NULL. If this parameter points to an IDirectPlayVoiceServer interface, you must call IDirectPlayVoiceServer::AddRef to increment the interface's reference count. Call IDirectPlayVoiceServer::Release when you no longer need the interface.

DVMSGID_INPUTLEVEL

Microsoft® DirectPlay® Voice generates the DVMSGID_INPUTLEVEL message periodically to notify the user of the input level from the microphone. The period of notification is set by the dwNotifyPeriod member of the DVCLIENTCONFIG structure. If the notification period is set to 0, this message will not be sent. In addition, if the client is running in half duplex mode, this message is not available.

DVMSG_INPUTLEVEL

The DVMSG_INPUTLEVEL structure contains information for the DVMSGID_INPUTLEVEL system message.

```
typedef struct {
    DWORD dwSize;
    DWORD dwPeakLevel;
    LONG lRecordVolume;
    PVOID pvLocalPlayerContext;
} DVMSG_INPUTLEVEL, *LPDVMSG_INPUTLEVEL,
*PDVMSG_INPUTLEVEL;
``` dwSize

Size of the DVMSG_INPUTLEVEL message structure.

dwPeakLevel

Integer representing peak level across the current frame, which corresponds to approximately 1/10 second of audio stream. The current frame typically lags 50-200 ms behind real-time. This value can range from 0 through 99, with 0 being completely silent and 99 being the highest possible input level.

lRecordVolume

Current recording volume for the client. The value can range from 10,000 to 0. This member is available even when automatic gain control is active.

pvLocalPlayerContext

Pointer to the context value set for the local player. This value is set through the pvPlayerContext member of the DVMSG_CREATEVOICEPLAYER message structure.

DVMSGID_LOCALHOSTSETUP

The DVMSGID_LOCALHOSTSETUP message is sent when the local client is elected to become the new voice host during host migration. The message is sent before the DVMSGID_HOSTMIGRATED message and gives you the chance to set the callback function and context value that will be used when creating the new host object. If you do not set either of the values, then the new server interface will have no callback function. Once the application returns from handling this message it will receive the DVMSGID_HOSTMIGRATED message. The new message has the following associated structure, which is passed in the void * field of the message handler.

DVMSG_LOCALHOSTSETUP

The DVMSG_LOCALHOSTSETUP structure contains information for the DVMSGID_LOCALHOSTSETUP system message.

```
typedef struct {
    DWORD dwSize;
    PVOID pvContext;
    PDVMESSAGEHANDLER pMessageHandler;
}DVMSG_LOCALHOSTSETUP, *LPDVMSG_LOCAL-
HOSTSETUP, *PDVMSG_LOCALHOSTSETUP;
``` dwSize

Size of the DVMSG_LOCALHOSTSETUP message structure.

pvContext

Set to the context value you want to set for the new server.

pMessageHandler

Set to the callback function to be used for the new server.

DVMSGID_LOSTFOCUS

The DVMSGID_LOSTFOCUS message is sent to notify you that you have stopped capturing audio. It is sent when an application that has capture focus loses it to another application. There is no data associated with this message. Refer to the Microsoft® DirectSound® documentation for more information on capturing audio.

DVMSGID_OUTPUTLEVEL

Microsoft® DirectPlay® Voice generates the DVMSGID_OUTPUTLEVEL message periodically to notify the user of the output level of playback. The period of notification is set by the dwNotifyPeriod member of the DVCLIENTCONFIG structure. If the notification period is set to 0, this message will not be sent.

DVMSG_OUTPUTLEVEL

The DVMSG_OUTPUTLEVEL structure contains information for the DVMSGID_OUTPUTLEVEL system message.

```
typedef struct {
    DWORD dwSize;
    DWORD dwPeakLevel;
    LONG lOutputVolume;
    PVOID pvLocalPlayerContext;
} DVMSG_OUTPUTLEVEL, *LPDVMSG_OUTPUT-
LEVEL, *PDVMSG_OUTPUTLEVEL;
``` dwSize
  Size of the DVMSG_OUTPUTLEVEL message structure.

dwPeakLevel
  Integer representing the current output level of playback. This value is in the range from 0 through 99, with 0 being completely silent and 99 being the highest possible output level.

lOutputVolume
  Current playback volume for the client.

pvLocalPlayerContext
  Pointer to the context value set for the local player. This value is set through the pvPlayerContext member of the DVMSG_CREATEVOICEPLAYER message structure.

IDVMSGID_PLAYEROUTPUTLEVEL
  Microsoft® DirectPlay® Voice generates the DVMSGID_PLAYEROUTPUTLEVEL message periodically to notify the user of the output level of an individual player's voice stream. It is generated while voice is being played back for an individual player. If multiple player voices are being played, one message for each player speaking will be sent each notification period.
  The period of notification is set by the dwNotifyPeriod member of the DVCLIENTCONFIG structure. If the notification period is set to 0, this message will not be sent.

DVMSG_PLAYEROUTPUTLEVEL
  The DVMSG_PLAYEROUTPUTLEVEL structure contains information for the DVMSGID_PLAYEROUTPUTLEVEL system message.

```
typedef struct {
    DWORD dwSize;
    DVID dvidSourcePlayerID;
    DWORD dwPeakLevel;
    PVOID pvPlayerContext;
} DVMSG_PLAYEROUTPUTLEVEL, *LPDVMSG_PLAYEROUTPUTLEVEL, *PDVMSG_PLAYEROUTPUTLEVEL;
``` dwSize
  Size of the DVMSG_PLAYEROUTPUTLEVEL message structure.

dvidSourcePlayerID
  DVID of the player whose voice is being played back.

dwPeakLevel
  Integer representing the current output level of the player's voice stream. This value is in the range from 0 through 99, with 0 being completely silent and 99 being the highest possible output level.

pvPlayerContext
  Pointer to the context value set for the player. This value is set through the pvPlayerContext member of the DVMSG_CREATEVOICEPLAYER message structure.

DVMSGID_PLAYERVOICESTART
  Microsoft® DirectPlay® Voice generates the DVMSGID_PLAYERVOICESTART message when an incoming audio stream begins playing back.

DVMSG_PLAYERVOICESTART
  The DVMSG_PLAYERVOICESTART structure contains information for the DVMSGID_PLAYERVOICESTART system message.

```
typedef struct {
    DWORD dwSize;
    DVID dvidSourcePlayerID;
    PVOID pvPlayerContext;
} DVMSG_PLAYERVOICESTART, *LPDVMSG_PLAYERVOICESTART, *PDVMSG_PLAYERVOICESTART;
``` dwSize
  Size of the DVMSG_PLAYERVOICESTART message structure.

dvidSourcePlayerID
  DVID of the player where the voice transmission originated.

pvPlayerContext
  Pointer to the context value set for the player. This value is set through the pvPlayerContext member of the DVMSG_CREATEVOICEPLAYER message structure.

DVMSGID_PLAYERVOICESTOP
  Microsoft® DirectPlay® Voice generates the DVMSGID_PLAYERVOICESTOP message when an incoming audio stream stops.

DVMSG_PLAYERVOICESTOP
  The DVMSG_PLAYERVOICESTOP structure contains information for the DVMSGID_PLAYERVOICESTOP system message.

```
typedef struct {
    DWORD dwSize;
    DVID dvidSourcePlayerID;
    PVOID pvPlayerContext;
} DVMSG_PLAYERVOICESTOP, *LPDVMSG_PLAYERVOICESTOP, *PDVMSG_PLAYERVOICESTOP;
``` dwSize
  Size of the DVMSG_PLAYERVOICESTOP message structure.

dvidSourcePlayerID
  DVID of the player where the voice transmission originated.

pvPlayerContext
  Pointer to the context value set for the player. This value is set through the pvPlayerContext member of the DVMSG_CREATEVOICEPLAYER message structure.

DVMSGID_RECORDSTART
  Microsoft® DirectPlay® Voice generates the DVMSGID_RECORDSTART message when audio input on the local client begins. This can be caused by the voice activation sensitivity level being exceeded or when a valid target is specified in push-to-talk mode.

DVMSG_RECORDSTART
  The DVMSG_RECORDSTART structure contains information for the DVMSGID_RECORDSTART system message.

```
typedef struct {
    DWORD dwSize;
    DWORD dwPeakLevel;
    PVOID pvLocalPlayerContext;
} DVMSG_RECORDSTART, *LPDVMSG_RECORDSTART, *PDVMSG_RECORDSTART;
``` dwSize
  Size of the DVMSG_RECORDSTART message structure.

dwPeakLevel
  Voice activation level that caused the transmission to begin. In push-to-talk mode, this value is 0.

pvLocalPlayerContext
  Pointer to the context value set for the local player. This value is set through the pvPlayerContext member of the DVMSG_CREATEVOICEPLAYER message structure.

DVMSGID_RECORDSTOP
  Microsoft® DirectPlay® Voice generates the DVMSGID_RECORDSTOP message when audio input on the local client stops. This can be caused by the voice activation sensitivity level not being reached or when a target is deselected in push-to-talk mode.

DVMSG_RECORDSTOP
  The DVMSG_RECORDSTOP structure contains information for the DVMSGID_RECORDSTOP system message.

```
typedef struct {
    DWORD dwSize;
    DWORD dwPeakLevel;
    PVOID pvLocalPlayerContext;
} DVMSG_RECORDSTOP, *LPDVMSG_RECORDSTOP, *PDVMSG_RECORDSTOP;
``` dwSize
  Size of the DVMSG_RECORDSTOP message structure.

dwPeakLevel
  Voice activation level that caused the transmission to stop. In push-to-talk mode, this value is 0.

pvLocalPlayerContext
  Pointer to the context value set for the local player. This value is set through the pvPlayerContext member of the DVMSG_CREATEVOICEPLAYER message structure.

DVMSGID_SESSIONLOST
  Microsoft® DirectPlay® Voice generates the DVMSGID_SESSIONLOST message when the voice session terminates.

DVMSG_SESSIONLOST
  The DVMSG_SESSIONLOST structure contains information for the DVMSGID_SESSIONLOST system message.

```
typedef struct {
    DWORD dwSize;
    HRESULT hrResult;
} DVMSG_SESSIONLOST, *LPDVMSG_SESSIONLOST, *PDVMSG_SESSIONLOST;
``` dwSize
  Size of the DVMSG_SESSIONLOST message structure.

hrResult
  HRESULT indicating why the session was terminated.

DVMSGID_SETTARGETS
  Microsoft® DirectPlay® Voice generates the DVMSGID_SETTARGETS message when the IDirectPlayVoiceClient::SetTransmitTargets or IDirectPlayVoiceServer::SetTransmitTargets methods are called.

DVMSG_SETTARGETS
  The DVMSG_SETTARGETS structure contains information for the DVMSGID_SETTARGETS system message.

```
typedef struct {
    DWORD dwSize;
    DWORD dwNumTargets;
    PDVID pdvidTargets;
} DVMSG_SETTARGETS, *LPDVMSG_SETTARGETS, *PDVMSG_SETTARGETS;
``` dwSize
  Size of the DVMSG_SETTARGETS message structure.

dwNumTargets
  Number of DVIDs contained in the pdvidTargets member.

pdvidTargets
  Array of DVIDs specifying the set targets. This can also be set to NULL if there are no targets.

Structures
  Structure for DirectPlay® Voice are:
  DVCAPS
  DVCLIENTCONFIG
  DVCOMPRESSIONINFO
  DVSESSIONDESC
  DVSOUNDDEVICECONFIG DVCAPS
  Describes the capabilities of the Microsoft® DirectPlay® VoiceClient object.

```
typedef struct{
    DWORD dwSize;
    DWORD dwFlags;
} DVCAPS, *LPDVCAPS, *PDVCAPS;
```

Members dwSize
  Must be set the to size of this structure, in bytes, before using this structure.

dwFlags
  Reserved. Must be 0.

DVCLIENTCONFIG
  Controls the run-time parameters for the client. The structure is first used in the call to IDirectPlayVoiceClient::Connect, where it sets the initial state of these parameters. The structure can be retrieved after a connection has been made by calling IDirectPlayVoiceClient::GetClientConfig, and set using IDirectPlayVoiceClient::SetClientConfig.

```
typedef struct {
    DWORD dwSize;
    DWORD dwFlags;
    LONG lRecordVolume;
    LONG lPlaybackVolume;
    DWORD dwThreshold;
    DWORD dwBufferQuality;
    DWORD dwBufferAggressiveness;
    DWORD dwNotifyPeriod;
} DVCLIENTCONFIG, *LPDVCLIENTCONFIG, *PDVCLIENTCONFIG;
```

Members dwSize
  Must be set the to size of this structure, in bytes, before using this structure.

dwFlags
  Combination of the following flags.

DVCLIENTCONFIG_AUTORECORDVOLUME
  Activates automatic gain control. With automatic gain control, Microsoft® DirectPlay® Voice adjusts the hardware input volume on your sound card automatically to get the best input level possible. You can determine the current input volume by looking at the lRecordVolume member after a call to IDirectPlayVoiceClient::GetClientConfig, or by looking at the lRecordVolume member of DVMSG_INPUTLEVEL messages.

DVCLIENTCONFIG_ECHOSUPPRESSION

Activates the echo suppression mode. This mode reduces echo introduced by configurations with external speakers and extremely sensitive microphones. While remote players' voices are being played back on the local speaker, the microphone is automatically muted. If the local player is transmitting, the playback of remote player voices is buffered until local input stops. After local input stops, playback resumes.

DVCLIENTCONFIG_MUTEGLOBAL

Mutes playback of the main sound buffer. Only sound buffers created through calls to IDirectPlayVoiceClient::Create3DSoundBuffer will be heard.

DVCLIENTCONFIG_PLAYBACKMUTE

Mutes playback of all DirectPlay Voice output and stops playback. This also stops decompression of incoming packets so CPU usage is reduced. Packets are effectively discarded while this flag is specified.

DVCLIENTCONFIG_RECORDMUTE

Mutes input from the microphone and stops recording. This also stops compression so CPU usage is reduced.

In addition to the preceding flags, the method of transmission is controlled by setting only one of the following flags or by not specifying either flag.

DVCLIENTCONFIG_AUTOVOICEACTIVATED

Places the transmission control system into automatic voice activation mode. In this mode, the sensitivity of voice activation is determined automatically by the system. The input level is adaptive, adjusting itself automatically to the input signal. For most applications this should be the setting used. This flag is mutually exclusive with the DVCLIENTCONFIG_MANUALVOICEACTIVATED flag.

DVCLIENTCONFIG_MANUALVOICEACTIVATED

Places the transmission control system into manual voice activation mode. In this mode, transmission of voice begins when the input level passes the level specified by the dwThreshold member. When input levels drop below the specified level, transmission stops. This flag is mutually exclusive with the DVCLIENTCONFIG_AUTOVOICEACTIVATED flag.

If you do not specify either DVCLIENTCONFIG_MANUALVOICEACTIVATED or DVCLIENTCONFIG_AUTOVOICEACTIVATED, the system will operate in push-to-talk mode. In push-to-talk mode, as long as there is a valid target specified the input from the microphone will be transmitted. Voice transmission stops when a NULL target is set or the current target leaves the session or is destroyed.

lRecordVolume

Value indicating what the volume of the recording should be set to. See the IDirectSoundBuffer8::SetVolume method for valid values.

If automatic gain control is enabled, this value can be set to DVRECORDVOLUME_LAST, which tells the system to use the current volume as determined by the automatic gain control algorithm. If a value other than DVRECORDVOLUME_LAST is specified in combination with automatic gain control, this value will be used to restart the algorithm at the specified value.

On return from a call to IDirectPlayVoiceClient::GetClientConfig, this value will contain the current recording volume. When adjusting the recording volume, DirectPlay Voice will adjust the volume for the microphone (if a microphone volume is present for the card) and the master recording volume (if one is present on the card). If neither a microphone volume nor a master record volume is present, DirectPlay Voice will be unable to adjust the recording volume.

lPlaybackVolume

Value indicating what the volume of the playback should be set to. Adjusting this volume adjusts both the main buffer and all 3-D sound buffers. See the IDirectSoundBuffer8::SetVolume method for valid values. You can specify DVPLAYBACKVOLUME_DEFAULT to use a default value that is appropriate for most situations (full volume).

dwThreshold

Input level used to trigger voice transmission if the DVCLIENTCONFIG_MANUALVOICEACTIVATED flag is specified in the dwFlags member. When the flag is specified, this value can be set to anywhere in the range of DVTHRESHOLD_MIN to DVTHRESHOLD_MAX. Additionally, DVTHRESHOLD_DEFAULT can be set to use a default value.

If DVCLIENTCONFIG_MANUALVOICEACTIVATED or DVCLIENTCONFIG_AUTOVOICEACTIVATED is not specified in the dwFlags member of this structure (indicating push-to-talk mode) this value must be set to DVTHRESHOLD_UNUSED.

dwBufferQuality

Buffer quality setting for the adaptive buffering algorithm. For most applications, this should be set to DVBUFFERQUALITY_DEFAULT. It can be set to anything in the range of DVBUFFERQUALITY_MIN to DVBUFFERQUALITY_ MAX. In general, the higher the value, the higher the quality of the voice but the higher the latency. The lower the value, the lower the latency but the lower the quality.

dwBufferAggressiveness

Buffer aggressiveness setting for the adaptive buffer algorithm. For most applications, this can be set to DVBUFFERAGGRESSIVENESS_DEFAULT. It can also be set to anything in the range of DVBUFFERAGGRESSIVENESS_MIN and DVBUFFERAGGRESSIVENESS_MAX. In general, the higher the value, the quicker the adaptive buffering adjusts to changing conditions. The lower the value, the slower the adaptive buffering adjusts to changing conditions.

dwNotifyPeriod

Value indicating how often you want to receive DVMSGID_OUTPUTLEVEL and DVMSGID_INPUTLEVEL (if session is full duplex) messages. If this value is set to 0, these messages are disabled. The value specifies the number of milliseconds between these messages. DVNOTIFYPERIOD_MINPERIOD specifies the minimum period between messages that is allowed.

DVCOMPRESSIONINFO

Describes the attributes of a specific Microsoft® DirectPlay® Voice compression type.

```
typedef struct{
    DWORD       dwSize;
    GUID        guidType;
    LPWSTR      lpszName;
    LPWSTR      lpszDescription;
```

```
    DWORD       dwFlags;
    DWORD       dwMaxBitsPerSecond;
} DVCOMPRESSIONINFO, *LPDVCOMPRESSIONINFO,
  *PDVCOMPRESSIONINFO;
```

Members dwSize

Must be set the to size of this structure, in bytes, before using this structure.

guidType

GUID used to identify this compression type by DirectPlay Voice.

lpszName

Pointer to a name describing the codec.

lpszDescription

Pointer to a longer name of the codec.

dwFlags

Reserved; must be 0.

dwMaxBitsPerSecond

Maximum number of bits per second claimed by the codec.

DVSESSIONDESC

Describes the desired or current session settings for the Microsoft® DirectPlay® Voice server. This structure is used by the voice session host to configure the session, and by the session host and clients to retrieve information about the current session. The dwFlags, dwSessionType, and guidCT members can only be set when the host starts the voice session. The host can change the buffer settings at any time.

```
typedef struct {
    DWORD dwSize;
    DWORD dwFlags;
    DWORD dwSessionType;
    GUID guidCT;
    DWORD dwBufferQuality;
    DWORD dwBufferAggresiveness;
} DVSESSIONDESC, *LPDVSESSIONDESC, *PDVSESSIONDESC;
```

Members dwSize

Must be set the to size of this structure, in bytes, before using this structure.

dwFlags

Combination of the following flags.

DVSESSION_NOHOSTMIGRATION

The voice host will not migrate regardless of the transport settings. If this flag is not specified, the voice host will migrate if the transport supports it.

DVSESSION_SERVERCONTROLTARGET

The clients are unable to control the target of their speech. Only the server player can control the target of their speech. If the server does not specify this flag, only the clients can control the target of their speech. This flag can be specified only in multicast and mixing sessions.

dwSessionType

The type of DirectPlay Voice session to run. The DVSESSIONTYPE_PEER flag is not available in client/server sessions; all other flags are valid for all session types. This member can be one of the following values.

DVSESSIONTYPE_PEER

Voice messages will be sent directly between players.

DVSESSIONTYPE_MIXING

Voice session will use a mixing server. In this mode of operation, all voice messages are sent to the server, which mixes them and then forwards a single, premixed stream to each client. This reduces the bandwidth and CPU usage on clients significantly at the cost of increased bandwidth and CPU usage on the server.

DVSESSIONTYPE_FOWARDING

Voice messages will be routed through the session host. This will save bandwidth on the clients at the expense of bandwidth usage on the server. This option is only useful if the session host has a high-speed connection.

guidCT

GUID specifying the compression type of the session.

dwBufferQuality

The buffer quality setting. This member is unused for all session types except mixing sessions. For all sessions except mixing sessions, set this member to DVBUFFERQUALITY_DEFAULT.

Allowable values are between DVBUFFERQUALITY_MIN and DVBUFFERQUALITY_MAX. Additionally, this member can be set to the following value.

DVBUFFERQUALITY_DEFAULT

Specifying this value tells DirectPlay Voice to use the system default for this value, which is adjustable through a registry entry that can also be set through Sounds and Multimedia in Control Panel.

dwBufferAggresiveness

Buffer aggressiveness setting. This member is unused for all session types except mixing sessions. For all sessions except mixing sessions, set this member to DVBUFFERAGGRESIVENESS_DEFAULT.

Allowable values are between DVBUFFERAGGRESIVENESS_MIN and DVBUFFERAGGRESIVENESS_MAX. Additionally, this member can be set to the following value.

DVBUFFERAGGRESIVENESS_DEFAULT

Specifying this value tells DirectPlay Voice to use the system default for this value, which is adjustable through a registry entry that can also be set through Control Panel.

DVSOUNDDEVICECONFIG

Used to set and retrieve information about the sound device configuration and cannot be changed once a connection has been made. After a connection is made, you can retrieve the current sound device configuration by calling IDirectPlayVoiceClient:: GetSoundDeviceConfig.

```
typedef struct {
    DWORD               dwSize;
    DWORD               dwFlags;
    GUID                guidPlaybackDevice;
    LPDIRECTSOUND       lpdsPlaybackDevice;
    GUID                guidCaptureDevice;
    LPDIRECTSOUNDCAPTURE lpdsCaptureDevice;
    HWND                hwndAppWindow;
    LPDIRECTSOUNDBUFFER lpdsMainBuffer;
    DWORD               dwMainBufferFlags;
    DWORD               dwMainBufferPriority;
```

-continued

```
} DVSOUNDDEVICECONFIG, *LPDVSOUNDDEVICECONFIG,
*PDVSOUNDDEVICECONFIG;
```

Members dwSize
Must be set the to size of this structure, in bytes, before using this structure.

dwFlags
A combination of the following flags.

DVSOUNDCONFIG_AUTOSELECT
Tells Microsoft® DirectPlay® Voice to attempt to automatically select (or unmute) the microphone line in the mixer for the specified recording device.

DVSOUNDCONFIG_HALFDUPLEX
Tells DirectPlay Voice to initialize itself in half-duplex mode. In half-duplex mode no recording takes place. If the initialization of the sound system fails in full-duplex mode, this flag will be set by the system.

DVSOUNDCONFIG_NORMALMODE
Tells DirectPlay Voice to use Microsoft® DirectSound® Normal Mode when initializing the DirectSound object. If this flag is not specified, the DirectSound object is initialized with DirectSound Priority Mode. See documentation for IDirectSound8::SetCooperativeLevel for more information. If a valid DirectSound object is specified in the lpdsPlaybackDevice member, this flag is ignored.

DVSOUNDCONFIG_SETCONVERSIONQUALITY
Enables better quality audio at the expense of higher CPU usage.

DVSOUNDCONFIG_NORECVOLAVAILABLE
Set by DirectPlay Voice if there are no volume controls available on the recording device you specified. You cannot set this flag.

DVSOUNDCONFIG_NOFOCUS
The voice application will never go out of focus. In other words, the application will never release the sound capture device. Use of this flag is not recommended.

DVSOUNDCONFIG_STRICTFOCUS
The voice application will lose focus whenever its window is not the foreground window.

Note
Applications should set the DVSOUNDCONFIG_NOFOCUS or DVSOUNDCONFIG_STRICTFOCUS flags only when strictly necessary. Instead, you should normally use the default behavior that results when neither flag is set.

guidPlaybackDevice
When this structure is used in the IDirectPlayVoiceClient::Connect method, this member specifies the GUID of the device used for playback. This must be specified even if the lpdsPlaybackDevice member is used. You can also specify the following default GUIDs provided by DirectSound.

DSDEVID_DefaultPlayback
The system default playback device.

DSDEVID_DefaultVoicePlayback
The default voice playback device.

When this structure is used in the IDirectPlayVoiceClient::GetSoundDeviceConfig method, this member contains the actual device GUID used for playback.

lpdsPlaybackDevice
When this structure is used in the IDirectPlayVoiceClient::Connect method, this member specifies the DirectSound object you want DirectPlay Voice to use for playback. The GUID specified in guidPlaybackDevice must match the one used to create the device specified by this parameter. If you used NULL when specifying the device when you created your DirectSound object, pass DSDEVID_DefaultPlayback for this member.

When this structure is used in the IDirectPlayVoiceClient::GetSoundDeviceConfig method, this member contains a pointer to the DirectSound object being used by DirectPlay Voice. This will either be a pointer to the object specified when Connect was called or a pointer to a newly created and initialized DirectSound object. If you want to use this DirectSound object, you must store the pointer and increment the reference count by calling AddRef on the DirectSound interface.

guidCaptureDevice
When this structure is used in IDirectPlayVoiceClient::Connect method, this member specifies the GUID of the device used for capture. This must be specified even if the lpdsCaptureDevice member is used. If you used NULL when specifying the device when you created your DirectSoundCapture object, pass DSDEVID_DefaultCapture for this member.

When this structure is used in the IDirectPlayVoiceClient::GetSoundDeviceConfig method, this member will contain the actual device GUID used for capture.

lpdsCaptureDevice
When this structure is used in the IDirectPlayVoiceClient::Connect method, this member specifies the DirectSound object you want DirectPlay Voice to use for capture. The GUID specified in guidCaptureDevice must match the one used to create the device specified by this parameter. If you want to have DirectPlay Voice create the DirectSoundCapture object for you, specify NULL for this member.

When this structure is used in the IDirectPlayVoiceClient::GetSoundDeviceConfig method, this member contains a pointer to the DirectSoundCapture object being used by DirectPlay Voice. This will either be a pointer to the object specified when Connect was called or a pointer to a newly created and initialized DirectSoundCapture object. If you want to use this DirectSoundCapture object, you must store the pointer and increment the reference count by calling AddRef on the IDirectSoundCapture8 interface. If the DirectPlay Voice object is operating in half duplex mode, this member will be NULL.

hwndAppWindow
Must be set to the handle of the window that will be used to determine focus for sound playback. See IDirectSound8::SetCooperativeLevel for information on DirectSound focus. If you do not have a window to use for focus, use GetDesktopWindow to use the desktop window.

lpdsMainBuffer
Pointer to an IDirectSoundBuffer8 interface, which is used to create the DirectPlay Voice main buffer. This can be either NULL or a user-created DirectSound buffer. If this member is set to NULL, DirectPlay Voice will create a buffer for the main voice buffer. If users specify a buffer here, DirectPlay Voice will use their buffer for the main voice buffer. User-created buffers have the following restrictions.

The buffer must be 22 kilohertz, 16-bit, Mono format.
The buffer must be at least 1 second in length.
The buffer must have been created with the DSBCAPS_GETCURRENTPOSITION2 and DSBCAPS_CTRL3D flags.
The buffer must not be a primary buffer.
The buffer must not be playing when it is passed to the DirectPlay Voice software.
The buffer must not be locked when it is passed to the DirectPlay Voice software.

dwMainBufferFlags

Passed directly to the dwFlags parameter of the IDirectSoundBuffer8::Play method when Play is called for the main buffer. The DSBPLAY_LOOPING flag is automatically added to this field. See the documentation on IDirectSoundBuffer8::Play for details. This parameter must be 0 if the lpdsMainBufferDesc member of this structure is NULL.

dwMainBufferPriority

Passed directly to the dwPriority parameter of the IDirectSoundBuffer8::Play method when Play is called on the main buffer. See documentation for IDirectSoundBuffer8::Play for more information. This member must be set to 0 if lpdsMainBufferDesc is NULL.

Return Values

Errors are represented by negative values and cannot be combined.

Success Codes

S_OK
The operation completed successfully.

Error Codes

DV_OK
The request completed successfully.

DV_FULLDUPLEX
The sound card is capable of full-duplex operation.

DV_HALFDUPLEX
The sound card can only be run in half-duplex mode.

DVERR_BUFFERTOOSMALL
The supplied buffer is not large enough to contain the requested data.

DVERR_EXCEPTION
An exception occurred when processing the request.

DVERR_GENERIC
An undefined error condition occurred.

DVERR_INVALIDBUFFER
The buffer is invalid.

DVERR_INVALIDFLAGS
The flags passed to this method are invalid.

DVERR_INVALIDOBJECT
The DirectPlay object pointer is invalid.

DVERR_INVALIDPARAM
One or more of the parameters passed to the method are invalid.

DVERR_INVALIDPLAYER
The player ID is not recognized as a valid player ID for this game session.

DVERR_INVALIDGROUP
The group ID is not recognized as a valid group ID for this game session.

DVERR_INVALIDHANDLE
The handle specified is invalid.

DVERR_OUTOFMEMORY
There is insufficient memory to perform the requested operation.

DVERR_PENDING
Not an error, this return indicates that an asynchronous operation has reached the point where it is successfully queued.

DVERR_NOTSUPPORTED
The operation is not supported.

DVERR_NOINTERFACE
The specified interface is not supported. Could indicate using the wrong version of DirectPlay.

DVERR_SESSIONLOST
The transport has lost the connection to the session.

DVERR_NOVOICESESSION
The session specified is not a voice session.

DVERR_CONNECTIONLOST
The connection to the voice session has been lost.

DVERR_NOTINITIALIZED
The IDirectPlayVoiceClient::Initialize or IDirectPlayVoiceServer::Initialize method must be called before calling this method.

DVERR_CONNECTED
The DirectPlayVoice object is connected.

DVERR_NOTCONNECTED
The DirectPlayVoice object is not connected.

DVERR_CONNECTABORTING
The connection is being disconnected.

DVERR_NOTALLOWED
The object does not have the permission to perform this operation.

DVERR_INVALIDTARGET
The specified target is not a valid player ID or group ID for this voice session.

DVERR_TRANSPORTNOTHOST
The object is not the host of the voice session.

DVERR_COMPRESSIONNOTSUPPORTED
The specified compression type is not supported on the local computer.

DVERR_ALREADYPENDING
An asynchronous call of this type is already pending.

DVERR_ALREADYINITIALIZED
The object has already been initialized.

DVERR_SOUNDINITFAILURE
A failure was encountered initializing the sound card.

DVERR_TIMEOUT
The operation could not be performed in the specified time.

DVERR_CONNECTABORTED
The connect operation was canceled before it could be completed.

DVERR_NO3DSOUND
  The local computer does not support 3-D sound.
DVERR_ALREADYBUFFERED
  There is already a user buffer for the specified ID.
DVERR_NOTBUFFERED
  There is no user buffer for the specified ID.
DVERR_HOSTING
  The object is the host of the session.
DVERR_NOTHOSTING
  The object is not the host of the session.
DVERR_INVALIDDEVICE
  The specified device is invalid.
DVERR_RECORDSYSTEMERROR
  An error in the recording system occurred.
DVERR_PLAYBACKSYSTEMERROR
  An error in the playback system occurred.
DVERR_SENDERROR
  An error occurred while sending data.
DVERR_USERCANCEL
  The user canceled the operation.
DVERR_UNKNOWN
  An unknown error occurred.
DVERR_RUNSETUP
  The specified audio configuration has not been tested. Call the IDirectPlayVoiceTest::CheckAudioSetup method.
DVERR_INCOMPATIBLEVERSION
  The client connected to a voice session that is incompatible with the host.
DVERR_INITIALIZED
  The Initialize method failed because the object has already been initialized.
DVERR_INVALIDPOINTER
  The pointer specified is invalid.
DVERR_NOTRANSPORT
  The specified object is not a valid transport.
DVERR_NOCALLBACK
  This operation cannot be performed because no callback function was specified.
DVERR_TRANSPORTNOTINIT
  Specified transport is not yet initialized.
DVERR_TRANSPORTNOSESSION
  Specified transport is valid but is not connected/hosting.
DVERR_TRANSPORTNOPLAYER
  Specified transport is connected/hosting but no local player exists.

APPENDIX B

Exemplary IDirectPlayVoiceNotify and IDirectPlayVoiceTransport Interfaces

The following are the functions for exemplary IDirectPlayVoiceNotify and IDirectPlayVoiceTransport interfaces. The functions are, for the purpose of this example, described in C and C++. In C++ the THIS and THIS_parameters are not required. In 'C' they are and they specify a pointer to the interface that the function is being called on. It will be understood that the interfaces provided in this Appendix is exemplary, and an interface that includes any combination or subset of these (or equivalent) functions and structures, is included within the spirit and scope of the invention.

IDirectPlayVoiceNotify
  The following three functions are standard COM interfaces which are described at http://msdn.microsoft.com HRESULT QueryInterface (THIS_REFIID riid, PVOID *ppvObj);
  Returns a pointer within this object instance that implements the interface.

ULONG AddRef (THIS);
  Adds one reference to the interface instance.

ULONG Release (THIS);
  Removes one reference from the interface instance. If the reference count reaches 0 the interface instance is destroyed. Returns 0 if the reference count is 0, a positive number otherwise.

The following are specific to the IDirectPlayVoiceNofity interface.

HRESULT Initialize (THIS);
  Initializes the DirectPlayVoice interface associated with this interface. During this call DirectPlayVoice will call GetSessioninfo on the associated Transport interface.

HRESULT NotifyEvent (THIS_DWORD dwEventID, DWORD_PTR dwParam1, DWORD_PTR dwParam2);
  Called by the DirectPlay engine (or applicable session/transport layer) when an event occurs that DirectPlayVoice needs to be informed about. See descriptions of DVEVENT_XXXXX (listed in Appendix A) for how the parameters are used for each message.
    dwEventID—Type of message (DVEVENT_XXXXXX).
    dwParam1—First parameter for the notification.
    dwParam2—Second parameter for the notification.

HRESULT ReceiveSpeechMessage (THIS_DVID dvidFrom, DVID dvidTo, PVOID pvMessage, DWORD dwSize);
  Called when a message is received by the transport that is for DirectPlayVoice.
    dvidFrom—Audio session ID for client this message came from.
    dvidTo—Audio session ID for who this message is targeted for.
    pvMessage—Pointer to the contents of the message.
    dwSize—Size of the message in bytes IDirectPlayVoiceTransport
  The following three functions are standard COM interfaces, which are described at http://msdn.microsoft.com HRESULT QueryInterface (THIS_REFIID riid, PVOID *ppvObj);
  Returns a pointer within this object instance that implements the interface.

ULONG AddRef (THIS);
  Adds one reference to the interface instance

ULONG Release (THIS);
  Removes one reference from the interface instance. If the reference count reaches 0 the interface instance is destroyed.
  The following functions are specific to IDirectPlayVoiceTransport.

HRESULT Advise (THIS_LPUNKNOWN lpUnk, DWORD dwObjectType);

Advises the transport to call us back via the interface passed in the LPUNKNOWN parameter. This function calls QueryInterface on the LPUNKNOWN for an IDirectPlayVoiceNotify. Must call IDirectPlayVoiceNotify::Initialize on the interface before returning.

LPUNKNOWN—IUnknown interface instance that supports the IDirectPlayVoiceNotify interface for the IDirectPlayVoiceNotify to make notifications on.

DWORD—Voice Object Type

DVTRANSPORT_OBJECTTYPE_SERVER or

DVTRANSPORT_OBJECTTYPE_CLIENT).

HRESULT UnAdvise (THIS_DWORD dwObjectType);

Tells the transport that we no longer need to be called back on our notify interface. The transport should Release the instance of the notify interface that they have.

DWORD—Voice Object Type (DVTRANSPORT_OBJECTTYPE_XXXX, which are described above in Appendix A).

HRESULT IsGroupMember (THIS_DVID dvidGroup, DVID dvidPlayerToCheck);

This function returns S_OK if the specified user is a member of the specified group.

DVID dvidGroup—DVID of the group to check.

DVID dvidPlayerToCheck—DVID of the player.

HRESULT SendSpeech (THIS_DVID dvidFrom, DVID dvidTo, PDVTRANSPORT_BUFFERDESC pdvBufferDesc, LPVOID pvContext, DWORD dwFlags) PURE;

Transmits a message from the specified user ID to the specified user ID. (Speech specific).

dvidFrom—DVID of the player this is from.

dvidTo—DVID of the player to send the packet to.

pdvBufferDesc—A reference counted structure describing the data to be sent.

pvContext—User context for send. This will be passed back to the application when the send completes.

dwFlags—Flags for the send, this can have either both, just one or neither of the following specified:

DVTRANSPORT_SEND_GUARANTEED:
If DVTRANSPORT_SEND_GUARANTEED is specified then data must be sent guaranteed. Otherwise data can be sent unguaranteed.

DVTRANSPORT_SEND_SYNC:
If DVTRANSPORT_SEND_SYNC is specified then this function does not return until the packet has been sent. Otherwise the function returns immediately and will call the voice layer with a DVEVENT_SENDCOMPLETE event when the send has completed.

HRESULT GetSessionInfo (THIS_PDVTRANSPORTINFO pdvTransportInfo);

Fills the passed structure with details on the session that is running on the transport object. See description of DVTRANSPORTINFO for details.

HRESULT IsValidEntity (THIS_DVID, PBOOL) PURE;

Checks to see if specified ID is a valid player or group in session.

dvidToCheck=ID to check for validity.

LPBOOL=Pointer to BOOL to place result. TRUE for Valid Player/Group, FALSE if it is not.

HRESULT SendSpeechEx (THIS_DVID dvidFrom, DWORD dwNumTargets,
  UNALIGNED DVID *pdvidTargetList,
  PDVTRANSPORT_BUFFERDESC pdvTransportDesc,
  LPVOID pvUserContext, DWORD dwFlags);

Transmits a message from the specified user ID to a list of user IDs.

dvidFrom—DVID of the player this is from.

dwNumTargets—Number of targets.

pdvidTargetList—An array of targets that this packet should be sent to. The number of elements must equal the value passed to dwNumTargets.

pdvBufferDesc—A reference counted structure describing the data to be sent.

pvContext—User context for send. This will be passed back to the application when the send completes.

dwFlags—Flags for the send, this can have either both, just one or neither of the following specified:

DVTRANSPORT_SEND_GUARANTEED:
If DVTRANSPORT_SEND_GUARANTEED is specified then data must be sent guaranteed. Otherwise data can be sent unguaranteed.

DVTRANSPORT_SEND_SYNC.
If DVTRANSPORT_SEND SYNC is specified then this function does not return until the packet has been sent. Otherwise the function returns immediately and will call the voice layer with a DVEVENT_SENDCOMPLETE event when the send has completed.

HRESULT IsValidGroup (THIS_DVID dvidGroup, PBOOL pfResult);

Checks to see if the specified ID is a valid Group ID dvidGroup=ID of the entity to check LPBOOL=Pointer to BOOL to place result. TRUE for Valid Group, FALSE if it is not.

HRESULT IsValidPlayer (THIS_DVID dvidPlayer, PBOOL pfResult);

Checks to see if the specified ID is a valid Player ID.

dvidPlayer—ID of the player to check.

PBOOL=Pointer to BOOL to place result. TRUE for Valid Group, FALSE if it is not.

Structures

The following structures are used by the exemplary IDirectPlayVoiceNotify and IDirectPlayVoiceTransport interfaces:

DVTRANSPORT_BUFFERDESC

```
typedef struct _DVTRANSPORT_BUFFERDESC
{
    DWORD       dwBufferSize;
    PBYTE       pBufferData;
    LONG        lRefCount;
    PVOID       pvContext;
    DWORD       dwObjectType;
    DWORD       dwFlags;
} DVTRANSPORT_BUFFERDESC, *PDVTRANSPORT_BUFFERDESC;
```

Fields:

dwBufferSize—Size of buffer passed in pBufferData in bytes.

pBufferData—Pointer to a buffer containing dwBufferSize bytes.

lRefCount—Reference count of the structure, when this reaches 0 it should be destroyed. It is set to 1 initially.

pvContext—Internal value used for the voice engine
dwObjectType=DVTRANSPORT_OBJECTTYPE_SERVER if this object belongs to a voice host, DVTRANSPORT_OBJECTTYPE_CLIENT if this object belongs to a voice client.

DVTRANSPORTINFO

```
typedef struct
{
    DWORD      dwSize;
    DWORD      dwFlags;
    DWORD      dwSessionType;
    DVID       dvidSessionHost;
    DVID       dvidLocalID;
    DWORD      dwMaxPlayers;
} DVTRANSPORTINFO, *LPDVTRANSPORTINFO, *PDVTRANSPORTINFO;
```

Fields:
dwSize—Should be set to the size of the structure in bytes
dwFlags—Combination of any of the following flags, can also be none of these flags:
  DVTRANSPORT_MIGRATEHOST—Host migration is desired.
  DVTRANSPORT_MULTICAST—Transport is capable of multicast.
  DVTRANSPORT_LOCALHOST—Transport on this client is the host of the transport session.
dwSessionType=DVTRANSPORT_PEERTOPEER for a peer to peer transport, DVTRANSPORT_SESSION_CLIENTSERVER for a client/server transport.
dvidSessionHost—Voice session ID of the host.
dvidLocalID—Voice session ID for the local client.
dwMaxPlayers—Maximum # of players allowed, 0=no maximum.

What is claimed is:

1. A method of sending first data from a first device to a destination device via a network to which a plurality of second devices are also connected, said first device being connected to a data session in a session/transport layer of the network, said data session of the session/transport layer of the network having a first session topology which defines a first set of one or more of said second devices to which data may be directly addressed from said first device in said session/transport layer, said method comprising the acts of:
  joining an audio session in an audio layer of the network, said audio session having a second session topology which defines a second set of one or more of said second devices to which data may be directly addressed from said first device in said audio layer, the session topology of the audio session in said audio layer being different from the session topology of the data session in said session/transport layer such that said second set of devices to which data may be directly addressed from said first device in said audio session of said audio layer is different from said first set of devices to which data may be directly addressed from said first device in said session of said session/transport layer, said destination device being a member of said audio session, wherein the audio layer exposes an application programming interface (API) to the session/transport layer to establish a link with the session transport layer;
  creating a first data package which contains:
    (a) said first data; and
    (b) a header;
  addressing said first data package to said destination device in accordance with the session topology of said audio session of said audio layer; and
  sending said first data package to said destination device via said data session of said session/transport layer.

2. The method of claim 1, wherein said first device is communicatively coupled to a microphone, and wherein said method further comprises:
  capturing said first data using said microphone.

3. The method of claim 1, wherein said destination device is not one of said second devices to which said first data can be directly addressed in said data session of said session/transport layer, and wherein said sending act comprises:
  appending a header to said first data package which indicates that said first data package is to be delivered to said destination device; and
  sending said first data package to a host device in said session/transport layer different from said destination device, said host device being a member of said first set.

4. The method of claim 3, further comprising the acts of:
  in said host device, receiving a second data package from a second device, said data package comprising: (a) second data; and (b) a header which indicates that said data package is to be delivered to said destination device; and
  said host device sending to said destination device a mixed stream comprising said first data and said second data.

5. The method of claim 3, further comprising the acts of:
  in said host device, receiving a second data package from a second device, said data package comprising: (a) second data; and (b) a header which indicates that said data package is to be delivered to said destination device; and
  said host device sending said first and second data packages separately to said destination device.

6. The method of claim 1, wherein said sending act comprises sending said first data package using non-guaranteed delivery.

7. One or more computer-readable storage media having computer-executable instructions to perform a method of sending first data from a first device to a destination device via a network to which a plurality of second devices are also connected, said first device being connected to a data session in a session/transport layer of a network, said data session of the session/transport layer of the network having a first session topology which defines a first set of one or more of said second devices to which data may be directly addressed from said first device in said session/transport layer, said method comprising the acts of:
  joining an audio session in an audio layer of the network, said audio session having a second session topology which defines a second set of one or more of said second devices to which data may be directly addressed from said first device in said audio layer, the session topology of the audio session in said audio layer being different from the session topology of the data session in said session/transport layer such that said second set of devices to which data may be directly addressed from said first device in said audio session of said audio layer is different from said first set of devices to which data may be directly addressed from said first device in said session of said session/transport layer, said destination device being a member of said audio session, wherein the audio layer exposes an application programming interface (API) to the session/transport layer to establish a link with the session transport layer;
  creating a first data package which contains:
    (a) said first data; and
    (b) a header;

addressing said first data package to said destination device in accordance with said session topology of said audio session of said audio layer; and sending said first data package to said destination device via said data session of said session/transport layer.

8. The one or more computer-readable storage media of claim 7, wherein said device is communicatively coupled to a microphone, and wherein said method further comprises:

capturing said first data using said microphone.

9. The one or more computer-readable storage media of claim 7, wherein said destination device is not one of said second devices to which said first data can be directly addressed in said data session of said session/transport layer, and wherein said sending act comprises:

appending a header to said data package which indicates that said data package is to be delivered to said destination device; and sending said data package to a host device in said session/transport layer different from said destination device, said host device being a member of said first set.

10. The one or more computer-readable storage media of claim 9, wherein said destination device is a member of said first set.

11. The one or more computer-readable storage media of claim 9, wherein said method further comprises the acts of:

in said host device, receiving a second data package from a second device, said data package comprising: (a) second data; and (b) a header which indicates that said data package is to be delivered to said destination device; and said host device sending to said destination device a mixed stream comprising said first data and said second data.

12. The one or more computer-readable storage media of claim 9, wherein said method further comprises the acts of:

in said host device, receiving a second data package from a second device, said data package comprising: (a) second data; and (b) a header which indicates that said data package is to be delivered to said destination device; and said host device sending said first and second data packages separately to said destination device.

13. The one or more computer-readable storage media of claim 7, wherein said sending act comprises sending said first data package using nonguaranteed delivery.

14. A method of sending first data from a first device to a destination device via a network to which a plurality of second devices are also connected, said first device being connected to a data session in a session/transport layer of the network, said data session of the transport/session layer of the network having a first session topology that comprises one of either a peer-to-peer session topology or a client-server topology and which defines a first set of one or more of said second devices to which data may be directly addressed from said first device in said data session of the session/transport layer, said method comprising the acts of:

joining an audio session in an audio layer of the network, said audio session of the audio layer having a second session topology that is different from the session topology of the data session of the session/transport layer and comprises one of either a peer to-peer topology, a forwarding topology, a mixing topology or an echo topology and which defines a second set of one or more of said second devices to which data may be directly addressed from said first device in said audio session of said audio layer, said second set of devices to which data may be directly addressed from said first device in said audio session of said audio layer being different from said first set of devices to which data may be directly addressed from said first device in said data session of said session/transport layer, said destination device being a member of said second set, wherein the session/transport layer and the audio layer each exposes a respective application programming interface (API) to the other layer, and wherein the two layers establish a link between them by providing each other with pointers to their respective APIs;

creating a first data package which contains:
(a) said first data; and
(b) a header;

addressing said first data package to said destination device in accordance with said session topology of said audio session of said audio layer; and sending said first data package to said destination device via said data session of said session/transport layer.

* * * * *